United States Patent [19]
Ikeda

[11] Patent Number: 5,870,356
[45] Date of Patent: Feb. 9, 1999

[54] OPTICAL STORAGE APPARATUS WHICH DETECTS A LENS POSITION SIGNAL WITHOUT A LENS POSITION SENSOR

[75] Inventor: Toru Ikeda, Kawasaki, Japan

[73] Assignee: Fujitsu Limited, Kawasaki, Japan

[21] Appl. No.: 884,513

[22] Filed: Jun. 27, 1997

[30] Foreign Application Priority Data

Oct. 14, 1996  [JP]  Japan .................................. 8-271025

[51] Int. Cl.⁶ .................................................. G11B 17/22
[52] U.S. Cl. ........................................... 369/32; 369/44.28
[58] Field of Search ................................... 369/32, 44.28, 369/44.29, 44.35, 44.32, 44.36, 56, 44.11, 44.31, 13, 110, 112, 44.33, 57, 44.13; 360/77.04

[56] References Cited

U.S. PATENT DOCUMENTS

| | | | |
|---|---|---|---|
| 5,163,033 | 11/1992 | Yanagi | 369/32 |
| 5,289,447 | 2/1994 | Kobayashi et al. | 369/44.28 |
| 5,396,477 | 3/1995 | Matsumoto et al. | 369/44.28 |

FOREIGN PATENT DOCUMENTS

| | | |
|---|---|---|
| 01184727 | 7/1989 | Japan . |
| 02201739 | 8/1990 | Japan . |
| 04038724 | 2/1992 | Japan . |
| 04245035 | 9/1992 | Japan . |
| 04265532 | 9/1992 | Japan . |
| 05128565 | 5/1993 | Japan . |

*Primary Examiner*—Ali Neyzari
*Attorney, Agent, or Firm*—Greer, Burns, & Crain, Ltd.

[57] ABSTRACT

When a pull-in to a target track due to a turn-on of a tracking servo unit fails and a seek error is detected, a seek error processing unit turns on, for example, a low speed lens lock control unit and controls a VCM so as to set an optical axial deviation of an objective lens to zero, thereby subsequently allowing a retry seek to be executed. The turn-on of the low speed lens lock control unit by the seek error processing unit is performed for a specified time after the detection of the seek error.

18 Claims, 28 Drawing Sheets

MEDIUM
INSERTING
DIRECTION

MEDIUM
INSERTING
DIRECTION

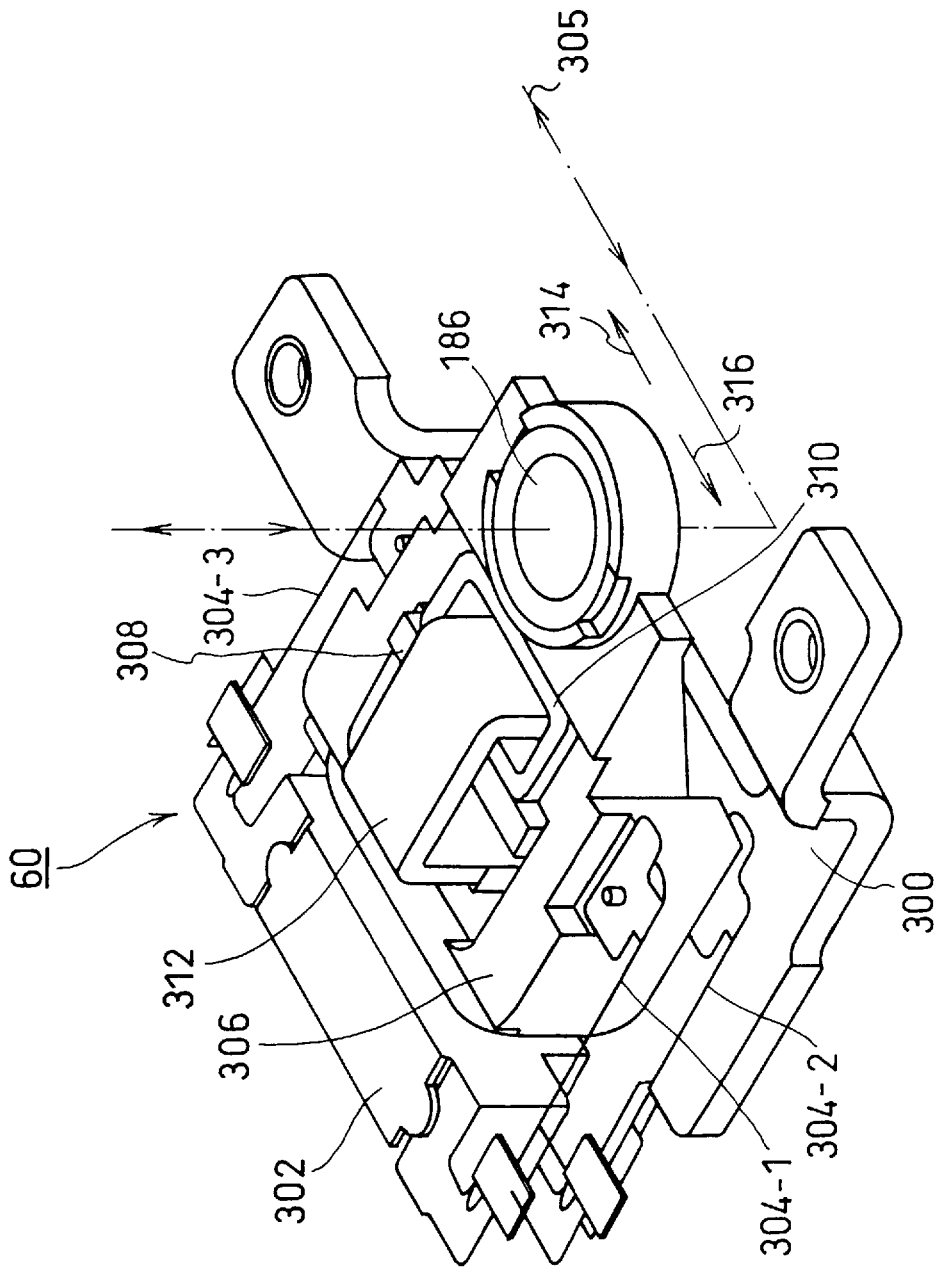

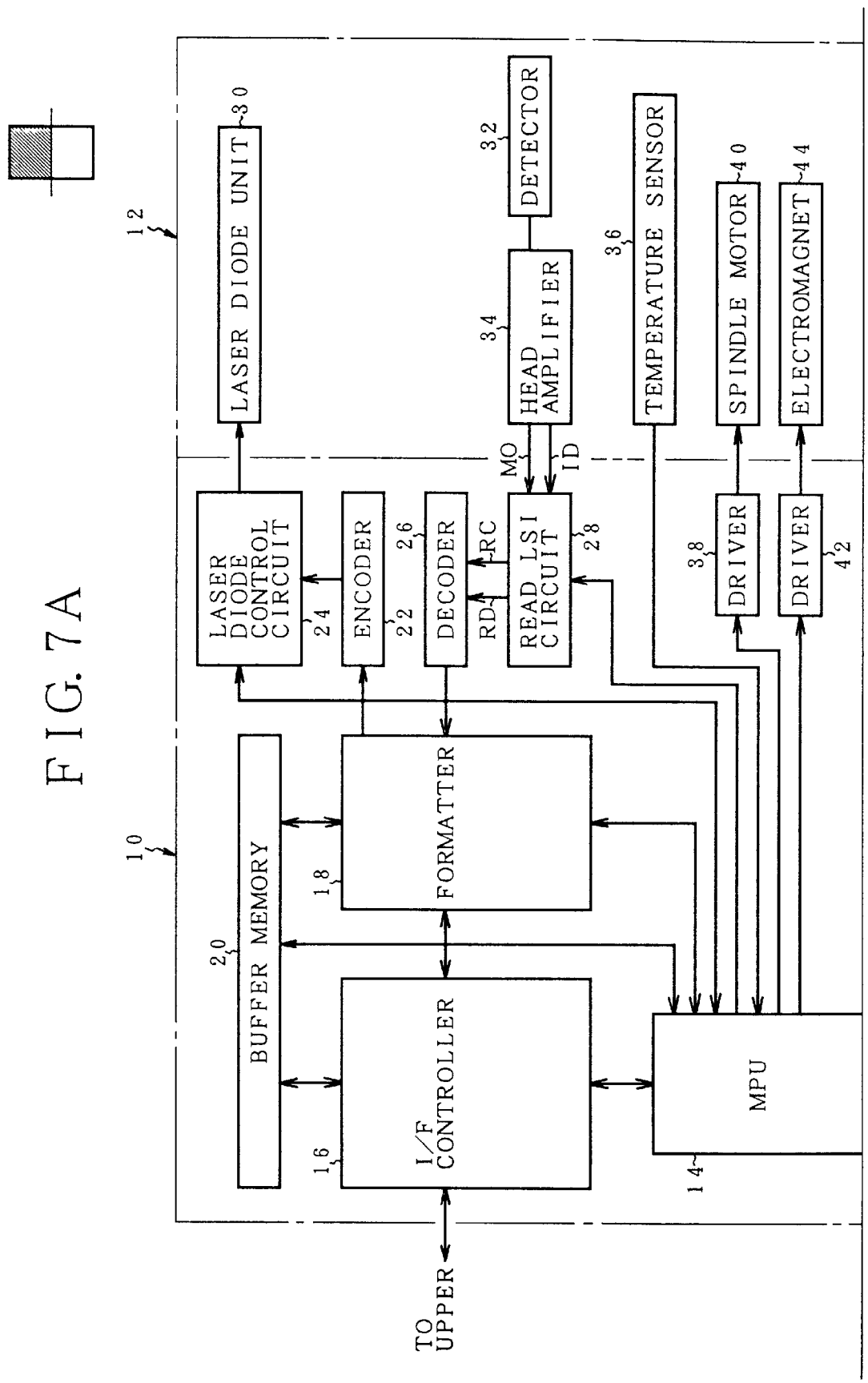

TRACKING ERROR
SIGNAL E2

PSEUDO LENS
POSITION
SIGNAL E3

TRACKING ERROR
SIGNAL E2

PSEUDO LENS
POSITION
SIGNAL E3

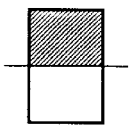
FIG. 15A
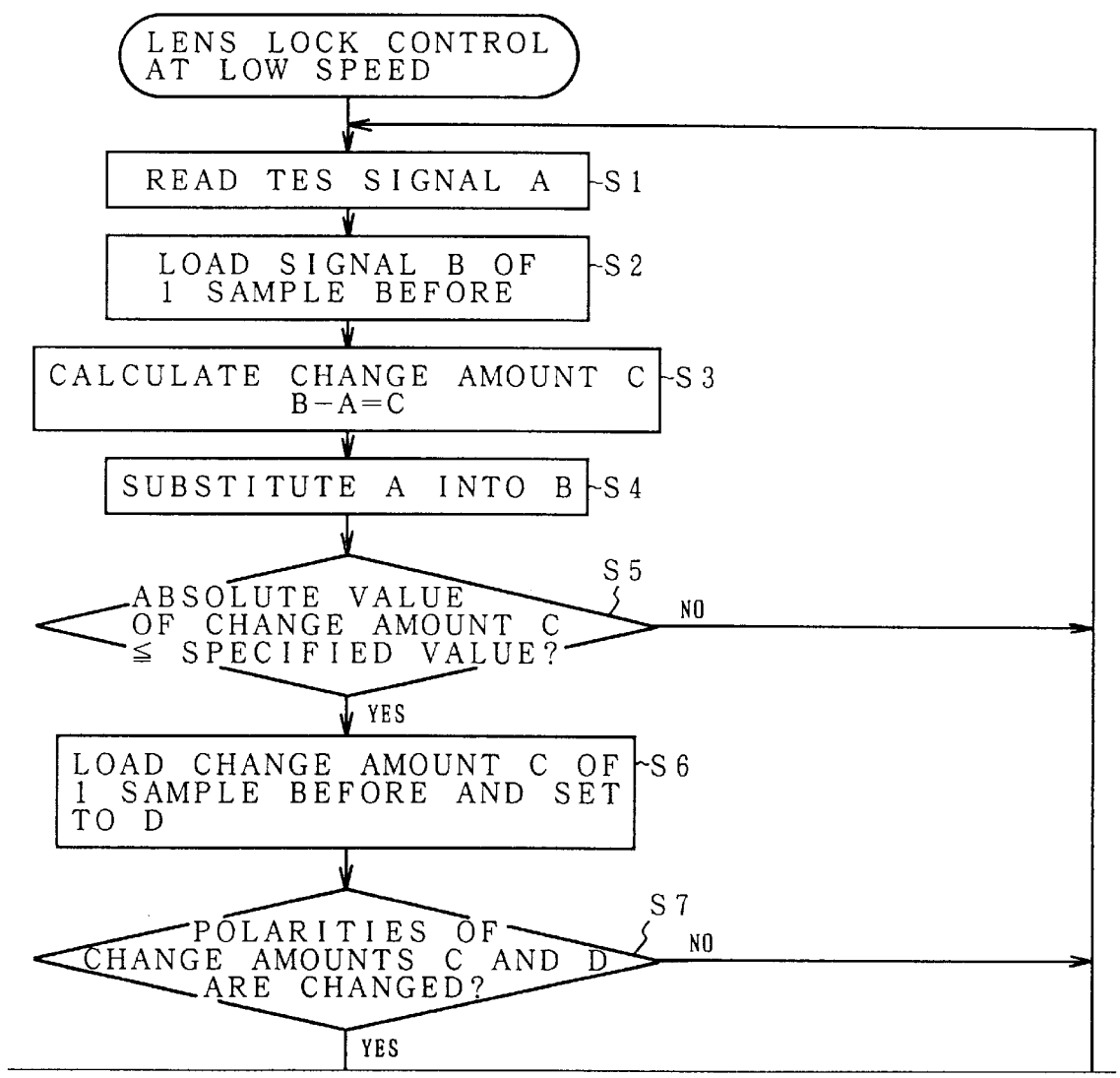

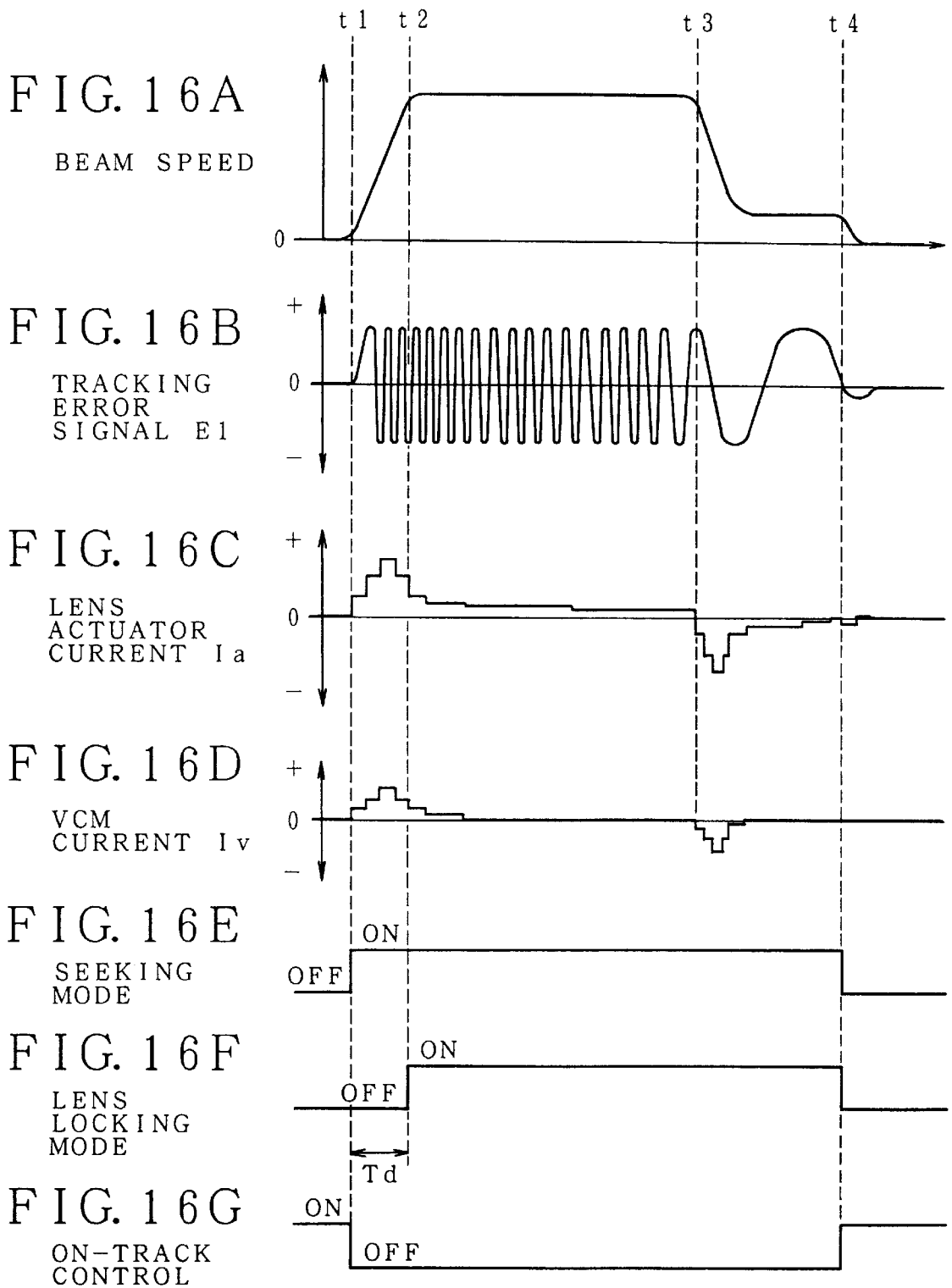

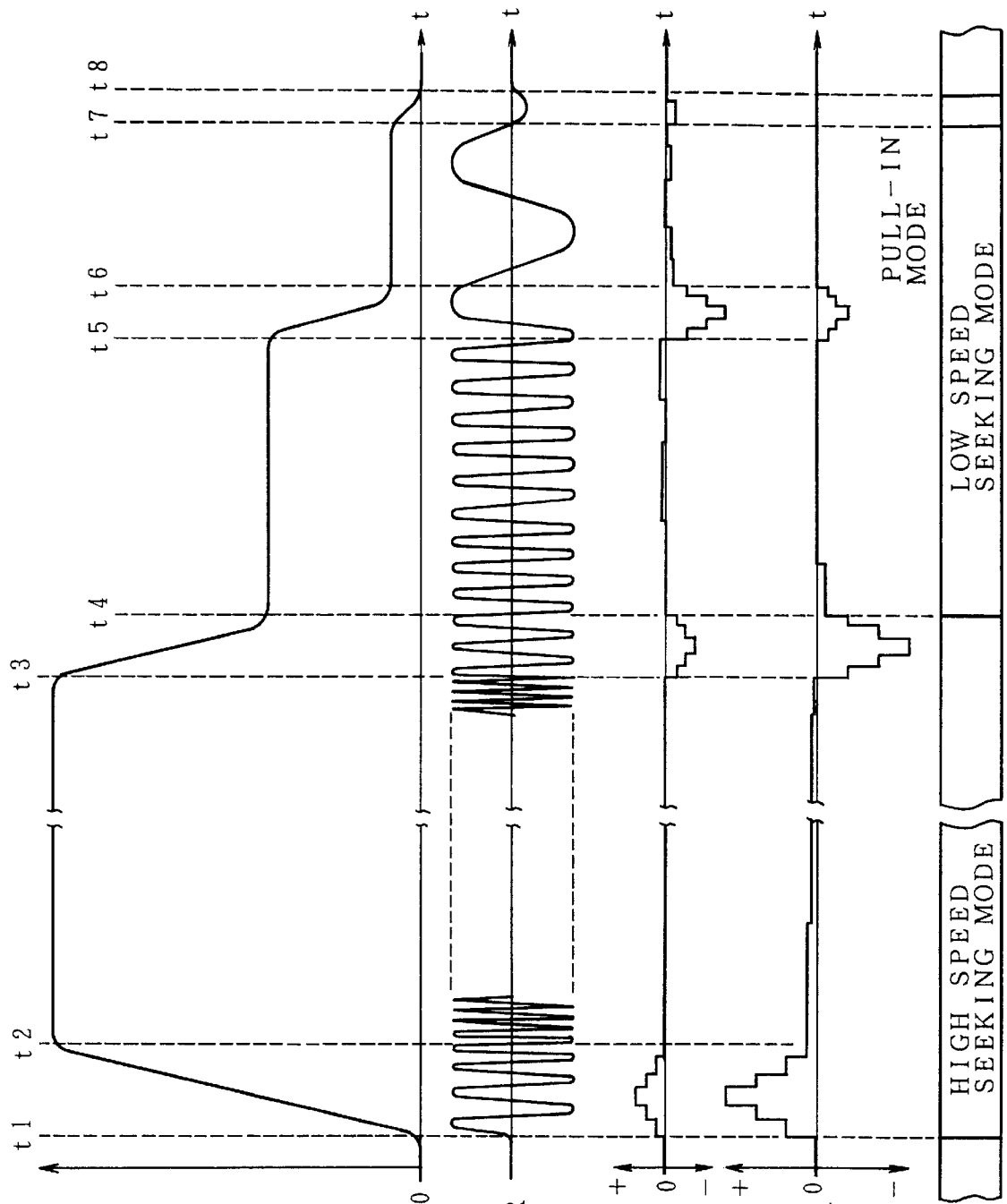

TES

LPF OUTPUT

TRACKING SERVO
(SEEK PULL-IN)

SEEK ERROR

TES

LPF OUTPUT

TRACKING SERVO
(SEEK PULL-IN)

SEEK ERROR

TES

LPF OUTPUT

TRACKING SERVO
(SEEK PULL-IN)

SEEK ERROR

LENS LOCK

OPTICAL STORAGE APPARATUS WHICH DETECTS A LENS POSITION SIGNAL WITHOUT A LENS POSITION SENSOR

BACKGROUND OF THE INVENTION

The present invention relates to an optical storage apparatus for optically recording and reproducing information to/from an exchangeable medium such as an MO cartridge or the like. More particularly, the invention relates to an optical storage apparatus for electrically substituting a lens position sensor which is eliminated to make the apparatus thin.

Attention is paid to an optical disk as a storage medium as a center of multimedia which has rapidly been developing in recent years. For example, as for an MO cartridge of 3.5 inches, MO cartridges of 128 MB, 230 MB, and the like are provided. An optical disk drive using such an MO cartridge is provided as an external storage apparatus of a desk-top type personal computer. Further, it is also strongly desired to use the optical disk drive in a notebook-sized personal computer having an excellent portability which has rapidly been spread in recent years. In order to equip the optical disk drive as an external storage apparatus as standard equipment, it is necessary to miniaturize and thin the optical disk drive. For example, a thickness of an HDD or FDD which is presently installed in a desk-top type personal computer is equal to about 17 mm. It is also necessary to make an optical disk drive thin to a similar extent.

The optical disk drive has a pickup mechanism of a linear driving type in the direction which traverses tracks on a medium. The pickup mechanism is constructed of a fixed optical unit and a movable optical unit mounted on a carriage which is linearly driven by a VCM. The movable optical unit is equipped with a lens actuator and has a relatively complicated mechanism in which a two-dimensional degree of freedom for moving an objective lens in the direction traversing the tracks by a current supply to a tracking coil and for moving the objective lens in the vertical direction by a current supply to a focusing coil is required. Further, a lens position sensor is usually mounted on the lens actuator. The lens position sensor can move the objective lens to the inner side or the outer side by only a micro distance around a position where the center of the objective lens is made coincide with the optical axis of a light beam from the fixed optical unit as a center by the current supply to the tracking coil. The lens position sensor detects a deviation amount of the optical axis of the lens from a neutral position of the lens. Consequently, in order to make the optical disk drive thin, it is necessary to simplify a structure of a pickup and to reduce a space in the height direction. If the lens position sensor provided for the lens actuator can be omitted, the optical disk drive can be made thinner.

SUMMARY OF THE INVENTION

According to the invention, an optical storage apparatus which can promptly execute a retry seek by certainly executing a lens lock upon occurrence of a seek error without having a lens position sensor.

In order to make an optical disk drive thin, it is necessary to simplify a structure of a pickup and to reduce a space in the height direction. If a lens position sensor provided for a lens actuator can be omitted, the optical disk drive can be made thinner. For the above subject, the inventors of the present invention paid attention to a phenomenon such that when the lens actuator is moved from the neutral position to the inner or outer side, an offset appears in a tracking error signal detected form a light returned from a medium, so that they discovered that a lens position signal can be electrically detected without providing the lens position sensor. Generally, the lens position signal is used to prevent optical axial deviation of an objective lens which occurs when the objective lens is moved from a neutral position and during the seek of a carriage. For this purpose, simultaneously with a speed control of the VCM, it is necessary to perform a lens lock control for positioning the lens actuator so as to keep the optical axial deviation of the objective lens to zero, specifically speaking, so as to always set the lens position signal to zero. Since the carriage and the lens actuator are simultaneously controlled, such a control is generally called a double servo control.

According to a method of detecting the lens position signal from the tracking error signal, by eliminating high-frequency components by passing the tracking error signal obtained during the seek through a low pass filter, a pseudo lens position signal having a level according to the optical axial deviation of the lens and a polarity according to the deviation direction is derived. The lens lock control for preventing the optical axial deviation during the seeking operation can be therefore performed even if the lens position sensor is not provided. The seek control for moving a light beam to a target track is divided into a long seek in which the number of tracks to the target track is equal to or larger than, for example, 50 tracks and a short seek in which the number of tracks to the target track is less than 50 tracks. In the long seek, the carriage is first sought at a high speed by a speed control of the VCM. When the number of remaining tracks reaches 50, a seeking mode is switched to a low speed seek by a speed control of the lens actuator and the light beam is moved to the target track. When the light beam arrives at the target track, a control mode is switched to a position control, the light beam is pulled into the track center, and after completion of a settlement, a reading or writing operation is started. The speed control of the VCM and the lens actuator during the seeking operation is a control so as to trace a target velocity which is set in accordance with the number of tracks to the target track and has speed profiles of acceleration, constant speed, and deceleration. On the other hand, in case of the short seek in which the number of tracks to the target track is less than 50, the low speed seek by the speed control of the lens actuator is executed from the beginning. The light beam is pulled in when it arrives at the target track.

In the case where the lens position sensor is not provided and the lens position signal is falsely obtained by passing the tracking error signal through the low pass filter, however, there are the following problems. During the seeking operation, a lens lock control for always keeping the optical axial deviation of the objective lens to zero is necessary. When the objective lens is deviated from the optical axis during the seeking operation, an offset occurs in the tracking error signal detected from the light returned from the medium, so that there are inconveniences such that a zero-cross point for counting the number of passing tracks cannot be accurately detected, and when the light beam is pulled to the target track, an error occurs in a beam position due to the offset and it takes a time for the pull-in. Consequently, the lens lock control is necessary with respect to both of the high speed seek by the driving of the VCM and the low speed seek by the driving of the lens actuator. In case of detecting the lens position signal by passing the tracking error signal through the low pass filter, however, when the light beam is accelerated or decelerated, there is a problem such that the stable lens position signal cannot be obtained from the low pass filter since a frequency of the tracking error signal fluctuates. A pseudo lens position signal which is obtained from the low pass filter is valid only in a constant speed period during which the frequency of the tracking error signal is constant. With respect to the acceleration and deceleration periods, by smoothly accelerating and decelerating the VCM, the motion of the lens actuator is suppressed to the minimum, or by applying the same acceleration and deceleration by supplying an acceleration current and a deceleration current to the lens actuator in correspondence to the acceleration and deceleration of the VCM, it is prevented that the optical axial deviation of the lens occurs. However, the acceleration current and deceleration current which are used for the lens lock upon acceleration and deceleration are controlled by fixed current values determined on the basis of design values of the carriage and lens actuator. In the actual apparatus, therefore, an unpredictable external force such as friction, vibration, or the like exists and the same acceleration and deceleration as those to the carriage by the VCM cannot be applied to the lens actuator, so that the optical axial deviation of the lens is likely to occur.

In the low speed seek for driving the lens actuator, the lens position signal cannot be obtained from the low pass filter for detecting the lens position signal from the tracking error signal in the high speed seeking mode. The frequency of the tracking error signal is controled to be equal to or higher than tens of kHz in the high speed seeking mode by the driving of the carriage by the VCM. On the other hand, in the low speed seeking mode the frequency of the tracking error signal is controled by the driving of the lens actuator, the frequency of the tracking error signal to be 10 kHz or less and the low pass filter passes the tracking error signal in the low speed seeking mode as it is, so that the lens position signal cannot be detected. In the low speed seeking mode, therefore, the lens position signal is not used but currents corresponding to the acceleration and deceleration of the lens actuator are supplied to the VCM and the same acceleration and deceleration as those to the lens actuator are applied to the carriage, thereby preventing the optical axial deviation of the lens. The lens lock control when the lens position signal is not obtained is, however, the control by the fixed current values determined on the basis of the design values of the carriage and lens actuator. When an unpredictable external force such as friction, vibration, or the like is received, the optical axial deviation of the lens is likely to occur. With respect to the high speed seek as well, since the seeking mode has been switched to the low speed seek at a position just before the target track, even if the acceleration and deceleration by using the fixed current values determined on the basis of the design values of the carriage and lens actuator are performed, when the unpredictable external force such as friction, vibration, or the like is applied, the same acceleration and deceleration as those to the lens actuator cannot be applied to the carriage. Consequently, the offset of the tracking error signal due to the optical axial deviation of the lens occurs, so that the number of passing tracks is erroneously counted and it takes a time to pull in the light beam to the target track.

The inventors of the present invention, therefore, propose an optical storage apparatus which can properly execute a lens lock control so as to set a deviation amount of an objective lens from an optical axis to zero by detecting a pseudo lens position signal on the basis of an offset of a tracking error signal not only during the high speed seek but also during the low speed seek when a light beam approaches a target track. Therefore, even if an unpredictable friction, external vibration, or the like is applied during the movement by a fixed inertia compensation of a carriage actuator by a fixed inertia compensation during the low speed seek, a lens lock control for maintaining the optical axial deviation of the objective lens to zero can be properly executed. Since the tracking error signal has no offset, the number of passing tracks can be accurately counted by a zero-cross detection. The pull-in of the light beam to the target track is stabilized and a total accessing performance can be improved. In an optical disk drive having no lens position sensor, however, in the case where an external vibration or the like is applied and the optical axial deviation of the objective lens occurs, when a tracking servo is turned on and the light beam is pulled in to the target track after completion of the seeking operation, since the control to suppress the optical axial deviation is invalid, a control abnormality such that a tracking actuator runs away occurs. In such a case, when a seek error is detected after passing the target track, the tracking servo is again turned on and the light beam is again pulled in to an arbitrary track. The track address is recognized from the track ID and a retry seek for the target track is executed. When the control to suppress the optical axial deviation is invalid and the optical axial deviation in which the tracking actuator runs away occurs, it is difficult to again pull the light beam into the arbitrary track by turning on the tracking servo. Consequently, the retry seek for the target track cannot be executed, it is necessary to restart the seeking operation after returning the light beam to the innermost start position like a case of a power-on, and there is a problem such that it takes a time to recover when the seek error occurs.

For such a problem, the optical storage apparatus of the invention certainly executes the lens lock when the seek error occurs even if the lens position sensor is not used, thereby enabling the retry seek to be promptly performed.

The optical storage apparatus of the invention has: a lens actuator for moving an objective lens to irradiate a light beam to a medium in the direction which traverses tracks on the medium; and a carriage actuator (VCM) for moving a carriage on which the lens actuator is mounted in the direction which traverses the tracks on the medium. A tracking error signal forming unit forms a tracking error signal according to the position in the direction which traverses the tracks on the medium on the basis of a photosensitive output of a light returned from the medium. A seek control unit has a low speed seek control unit and a high speed seek control unit. The low speed seek control unit moves the light beam to the target position at a low speed by driving the lens actuator when the number of tracks to the target track is less than a predetermined value. The high speed seek unit moves the light beam to the target position at a high speed by driving the carriage actuator when the number of tracks to the target track is equal to or larger than the predetermined value. When the number of tracks to the target track reaches the predetermined value during the high speed movement, the control mode is switched to the low speed movement of the light beam by the low speed seek control unit. Further, the apparatus has: a lens lock control unit for detecting an optical axial deviation amount and controlling so that the optical axial deviation of the objective lens is equal to zero; and an on-track control unit for pulling in the light beam to the target track and performing the on-track control when the light beam arrives at the target track by the low speed seek control unit.

The optical storage apparatus of the invention further has a seek error processing unit for executing a retry seek after controlling in a manner such that when the pull-in of the light beam by the on-track control unit fails and a seek error is detected, the lens lock control unit is turned on and controlled so as to set the optical axial deviation amount of the objective lens to zero. The seek error processing unit turns on the lens lock control unit for a predetermined specific time. By turning on the lens lock control unit by the seek error processing unit when the seek error is detected, the optical axial deviation of the objective lens at the time of the seek error is suppressed, the light beam can be again pulled in after that and the control mode can be promptly shifted to the retry seek.

The lens lock control unit is made up of a low speed lens lock control unit and a high speed lens lock control unit. The low speed lens lock control unit detects the optical axial deviation amount of the objective lens from an offset of the tracking error signal which is obtained during the low speed seek and drives the carriage actuator so as to set the optical axial deviation amount to zero. The high speed lens lock control unit detects the optical axial deviation amount of the objective lens from an offset of the tracking error signal which is obtained during the high speed seek and drives the lens actuator so as to set the optical axial deviation amount to zero. Consequently, the lens position signal is also falsely obtained from the tracking error signal during the low speed seek and the carriage actuator moves while tracing the motion of the lens actuator so as to eliminate the optical axial deviation amount of the lens by the lens position signal. The seek error processing unit controls in a manner such that when a seek error due to a failure in the pull-in of the light beam to the target track is detected, the low speed lens lock control unit is turned on and the optical axial deviation amount of the objective lens is set to zero by driving the carriage actuator (VCM). As another embodiment, the seek error processing unit can also controls in a rule such that when the seek error due to the failure in the pull-in of the light beam to the target track is detected, the high speed lens lock control unit is turned on and the optical axial deviation amount of the objective lens is set to zero by driving the lens actuator.

As a high speed lens lock control unit, a low pass filter for eliminating high frequency components by a cut-off frequency corresponding to the frequency of the tracking error signal in the high speed seeking mode and detecting an offset amount, as a lens position signal, corresponding to a change of an envelope of the tracking error signal is used. The tracking error signal in the high speed seeking mode has a frequency of 10 kHz or more and high frequency components can be relatively easily eliminated by the low pass filter. An analog active filter or a digital filter can be used as a low pass filter. The low speed lens lock control unit has: a peak value detecting unit for detecting a positive peak value and a negative peak value of each cycle of the tracking error signal; and an offset operating unit for calculating a value of ½ of a difference between the positive and negative peak values as an offset amount and detecting a pseudo lens position detection signal. The above construction is suitable for a digital process of the tracking error signal. Even at a low frequency of the tracking error signal by which it is difficult to construct a filter, the lens position signal can be accurately formed. The above construction is also suitable to a case of realizing a servo system of the seek control by a DSP or the like. As a second embodiment of the low speed and high speed lens lock control units, the apparatus can also include: a low pass filter for eliminating high frequency components of the tracking error signal and detecting the offset amount which traces the change in the envelope as a lens position signal; and a filter characteristics switching unit for switching a cut-off frequency of the low pass filter to the low frequency side in the low speed seeking mode and to the high frequency side in the high speed seeking mode. In this case, since it is sufficient to use one low pass filter and to merely switch the cut-off frequency, the circuit construction can be simplified. As a second embodiment of the low speed and high speed lens lock control units, the apparatus includes: a low pass filter for high speed for eliminating high frequency components by a cut-off frequency on the high frequency side corresponding to the frequency of the tracking error signal in the high speed seeking mode and outputting as a lens position signal; and a low pass filter for low speed which is serially connected to the low pass filter for high speed, eliminates the high frequency components by a cut-off frequency on the low frequency side corresponding to the frequency of the tracking error signal in the low speed seeking mode and outputs as a lens position signal. The low speed seek control unit controls the speed of the lens actuator so as to follow a target velocity set in accordance with the number of tracks (note: track difference) to the target track and applies an acceleration or deceleration for inertia compensation corresponding to the acceleration or deceleration of the lens actuator to the carriage actuator with respect to each of the acceleration period and the deceleration period of the speed control. For example, the low speed seek control unit supplies an inertia compensation current Iv obtained by multiplying an acceleration current or deceleration current I$a$ of the lens actuator with an inertia compensation coefficient $\alpha 1$ to the carriage actuator. The inertia compensation coefficient $\alpha 1$ is defined by $$\alpha 1 = (Kv/Ka) \cdot \{Ma/(Ma+Mv)\}$$

where, Ka: acceleration gain of the lens actuator
    Kv: acceleration gain of the tracking actuator
    Ma: mass of the lens actuator
    Mv: mass of the carriage actuator The high speed seek control unit controls the speed of the carriage actuator so as to trace the target velocity set in accordance with the number of tracks to the target track and applies an acceleration or deceleration for an inertia compensation corresponding to the acceleration or deceleration of the carriage actuator to the lens actuator with respect to each of the acceleration period and the deceleration period of the speed control. For example, the high speed seek control unit supplies an inertia compensation current Iv obtained by multiplying the acceleration or deceleration current I$a$ of the carriage actuator with an inertia compensation coefficient $\alpha 2$ to the lens actuator. Further, the on-track control unit has: a tracking servo unit for driving the lens actuator so as to set the tracking error signal to zero; and a double servo unit for obtaining the optical axial deviation amount of the objective lens by predicting the motion of the lens actuator from a drive current thereof by the tracking servo unit and driving the carriage actuator so as to set the optical axial deviation amount to zero, thereby allowing the carriage to trace the motion of the objective lens.

The above and other objects, features, and advantages of the present invention will become more apparent from the following detailed description with reference to the drawings.

BRIEF DESCRIPTION OF THE DRAWINGS

FIG. 6 is an explanatory diagram of a structure of a lens actuator which is used in the invention;

FIGS. 7A and 7B are circuit block diagrams of the invention;

FIGS. 15A and 15B are detailed flowcharts for an inertia compensation control and a lens lock control of a VCM in the low speed seeking mode in FIG. 14;

FIGS. 16A to 16G are time charts for a beam speed, a tracking error signal, a lens actuator current, a VCM current, a seeking mode, and a lens locking mode at the time of a low speed seek control;

FIGS. 17A to 17E are time charts for a beam speed, a tracking error signal, a lens actuator current, a VCM current, and a control mode at the time of a high speed seek control;

FIGS. 20A to 20D are time charts when a seek error occurs by the track pull-in;

FIGS. 21A to 21E are time charts according to the seek error process in FIG. 18 when a seek error occurs by the track pull-in;

DETAILED DESCRIPTION OF THE PREFERRED EMBODIMENTS

[Apparatus structure]

Figure 1:
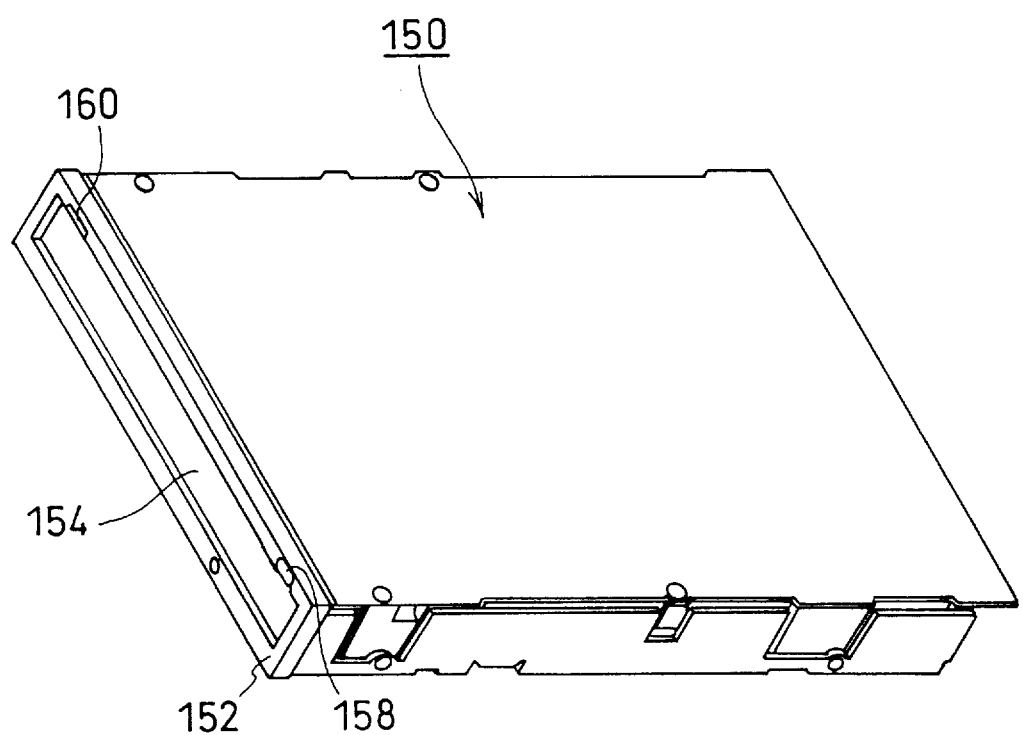
FIG. 1 is an external view of an apparatus of the invention.

FIG. 1 is an external explanatory diagram of an optical storage apparatus, namely, an optical disk drive of the invention. A front vessel 152 in which a medium insertion port is opened is provided in a front portion of a drive main body 150. A lid 154 is rotatably attached to the medium insertion port of the front vessel 152 while using upper portions on both sides to rotational axes and is urged by a built-in spring in a closing direction. Therefore, the lid is opened or closed in association with an insertion/ejection of an MO cartridge medium. An ejection button 158 and an operation display LED 160 are provided around the front vessel 152. A height of front vessel 152 is set to about 17 mm. A height of drive main body 150 is set to be slightly lower than that of the front vessel.

Figure 2:
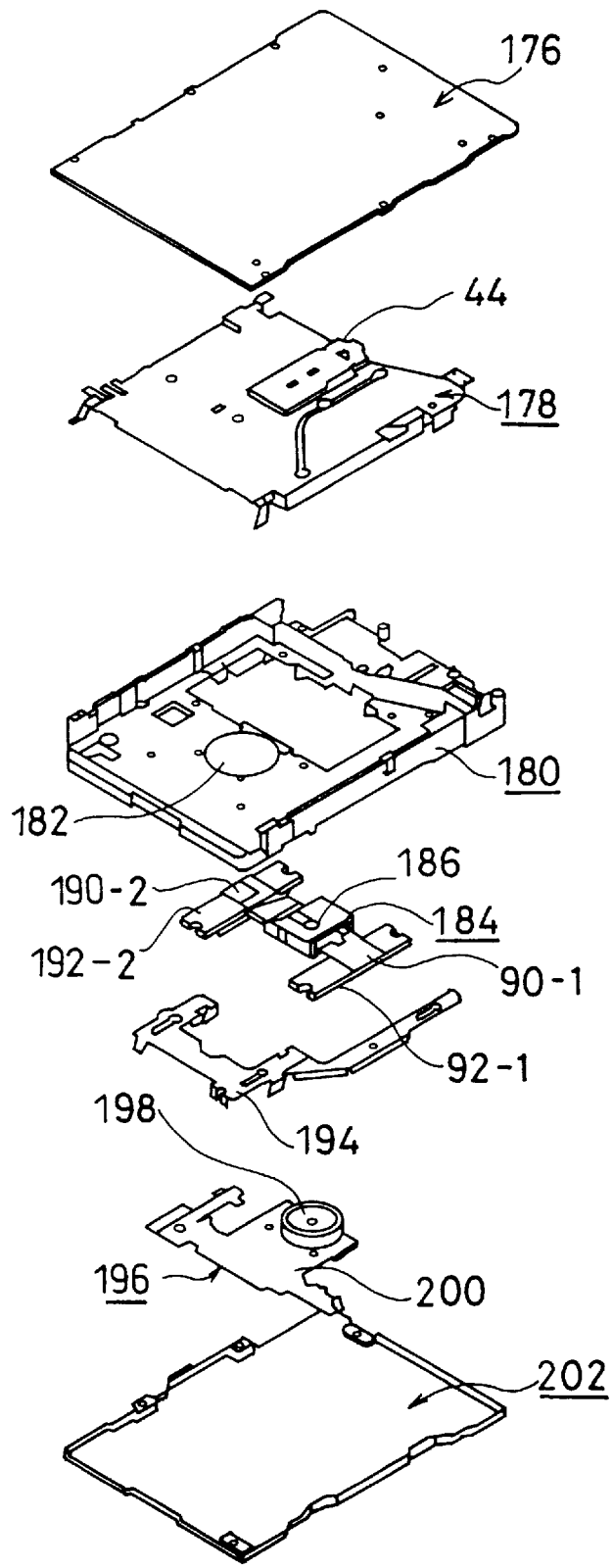
FIG. 2 is an assembly exploded diagram of the apparatus in FIG. 1.

FIG. 2 is an assembly exploded diagram of the drive main body 150 in FIG. 1. The drive main body 150 is made up of: a printed circuit board 176; a cartridge holder 178; a drive base 180; a lens carriage 184; a slide plate 194; a spindle unit 196; and a cover 202 from the top. Among them, with respect to the component elements in a range from the drive base 180 to cover 202 on the lower side, an assembly exploded diagram is further shown in FIG. 4 in a state in which they are seen from the back side. A control circuit necessary to control the drive main body 150 is mounted on the printed circuit board 176. The cartridge holder 178 forms a medium enclosing space between the drive base 180 locating in the lower portion and the cartridge holder, thereby positioning the MO cartridge medium inserted from the front side. An electromagnet 44 is also attached onto the cartridge holder. The lens carriage 184, slide plate 194, and spindle unit 196 are attached to the drive base 180. The lens carriage 184 constructs a movable optical system and has an objective lens 186. A leaser beam from a fixed optical unit 208 provided on the bottom side of the drive base 180 in FIG. 4 enters the objective lens 186, irradiates a beam spot onto the medium locating upward, and returns a return light to the fixed optical unit 208. Coil units 190-1 and 190-2 of a VCM are arranged on both sides of the lens carriage 184 so as to have gaps between the coil units 190-1 and 190-2 and magnetic yokes 192-1 and 192-2 which are fixedly arranged. Therefore, by supplying currents to the coil units 190-1 and 190-2, linear motors are formed between the coil units 190-1 and 190-2 and the magnetic yokes 192-1 and 192-2, so that, the lens carriage 184 can be operated in a direction which traverses the tracks on the medium. A lens actuator for moving the objective lens 186 in the direction which traverses the tracks on the medium and a focusing actuator for moving the objective lens 186 in an optical axial direction and executing a focusing control are mounted on the lens carriage 184. In association with the insertion of the MO cartridge medium, the slide plate 194 attaches a medium hub to a turntable 198 locating in the lower portion of the spindle unit 196. When ejecting the MO cartridge medium, by driving an ejection motor unit 204 in FIG. 3, the slide plate 194 is integratedly moved in the depth direction for the drive base 180, the turntable 198 is fell down and is unlocked from the medium, thereby ejecting the MO cartridge medium by a spring provided for the cartridge holder 178. In the spindle unit 196, the turntable 198 is attached onto a plate 200 and a spindle motor is built in the turntable 198. By assembling the plate 200 to the lower side of the drive base 180, the turntable 198 is located in an aperture 182 of the spindle unit 196.

Figure 4:
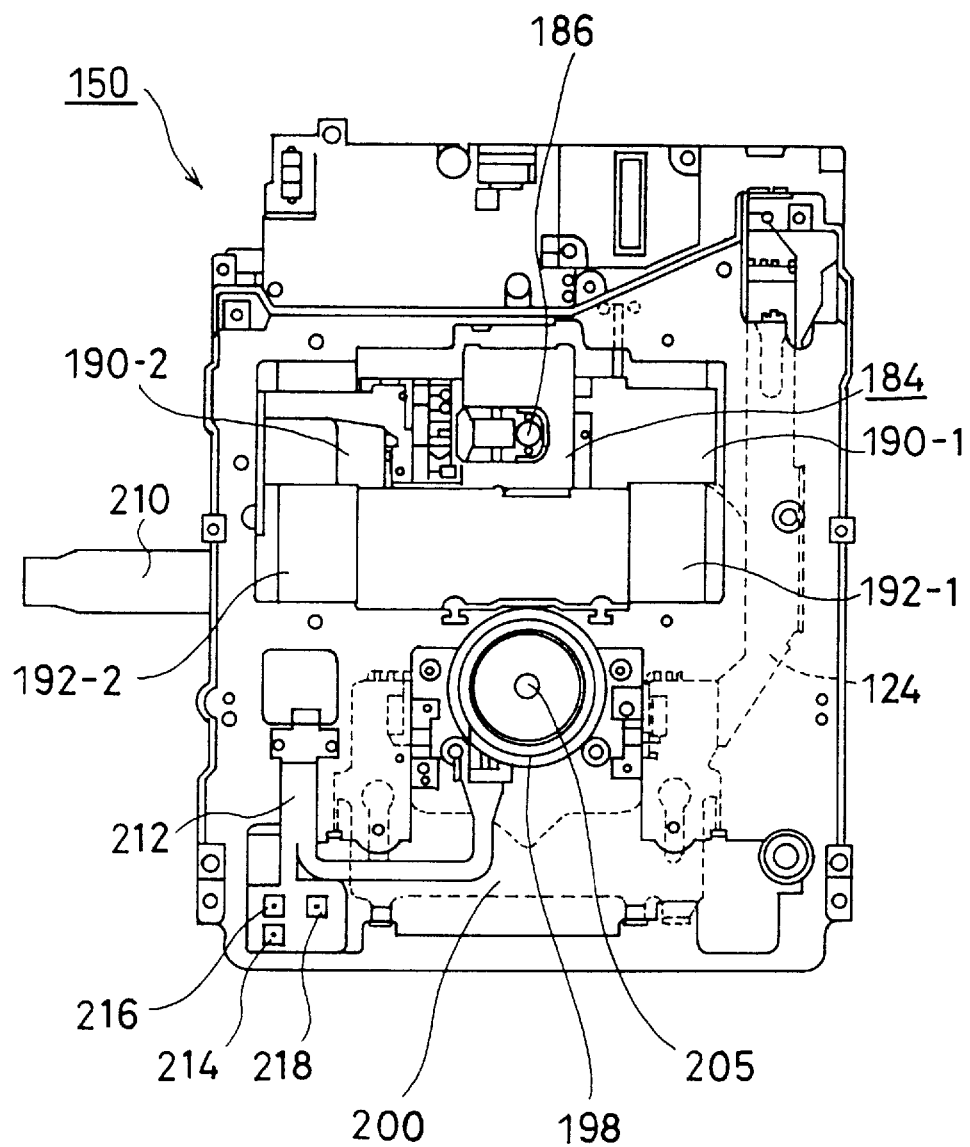
FIG. 4 is a plan view of an assembling state in FIG. 2.

FIG. 4 is a plan view of a state in which the printed circuit board 176 and cartridge holder 178 in FIG. 2 are removed from the drive main body 150 in FIG. 1. A spindle shaft 205 is attached to the center of the turntable 198 in the spindle unit. The hub of the medium of the MO cartridge inserted from the medium insertion port serving as a lower side is connected to the spindle shaft 205. In association with the medium insertion, when the medium hub is located to the spindle shaft 205, the medium is attracted by a magnet chucking, thereby connecting the hub to the spindle shaft 205. The objective lens 186 is arranged upward for lens carriage 184. By supplying currents to the coil units 190-1 and 190-2 arranged on both sides of the lens carriage 184, the lens carriage 184 moves in the vertical direction for the magnetic yokes 192-1 and 192-2, namely, in the direction traversing the tracks on the medium attached to the spindle shaft 205. An FPC 212 is arranged on the medium inserting side serving as a front side of the turntable 198, thereby electrically connecting to the spindle motor built in the turntable 198. The FPC 212 continues to an FPC 210 led out to the side surface side, thereby connecting to the printed circuit board side. A write enable sensor 214, a write protection sensor 216, and a cartridge insertion sensor 218 are provided for the FPC 212 arranged on the entrance side. Pin switches or the like are used as those three sensors 214, 216, and 218. The write enable sensor 214 detects a write enable position of a switching knob of a write enable and a write protection which is provided for the MO cartridge medium. The write protection sensor 216 detects a write protecting position of an exchange knob of a write enable and a write protection of the medium. The cartridge insertion sensor 218 detects the insertion of the MO cartridge medium to the drive main body 150, thereby making the drive operative. Specifically speaking, the turntable 198 is rotated by the spindle motor, thereby starting the operation of the controller.

Figure 3:
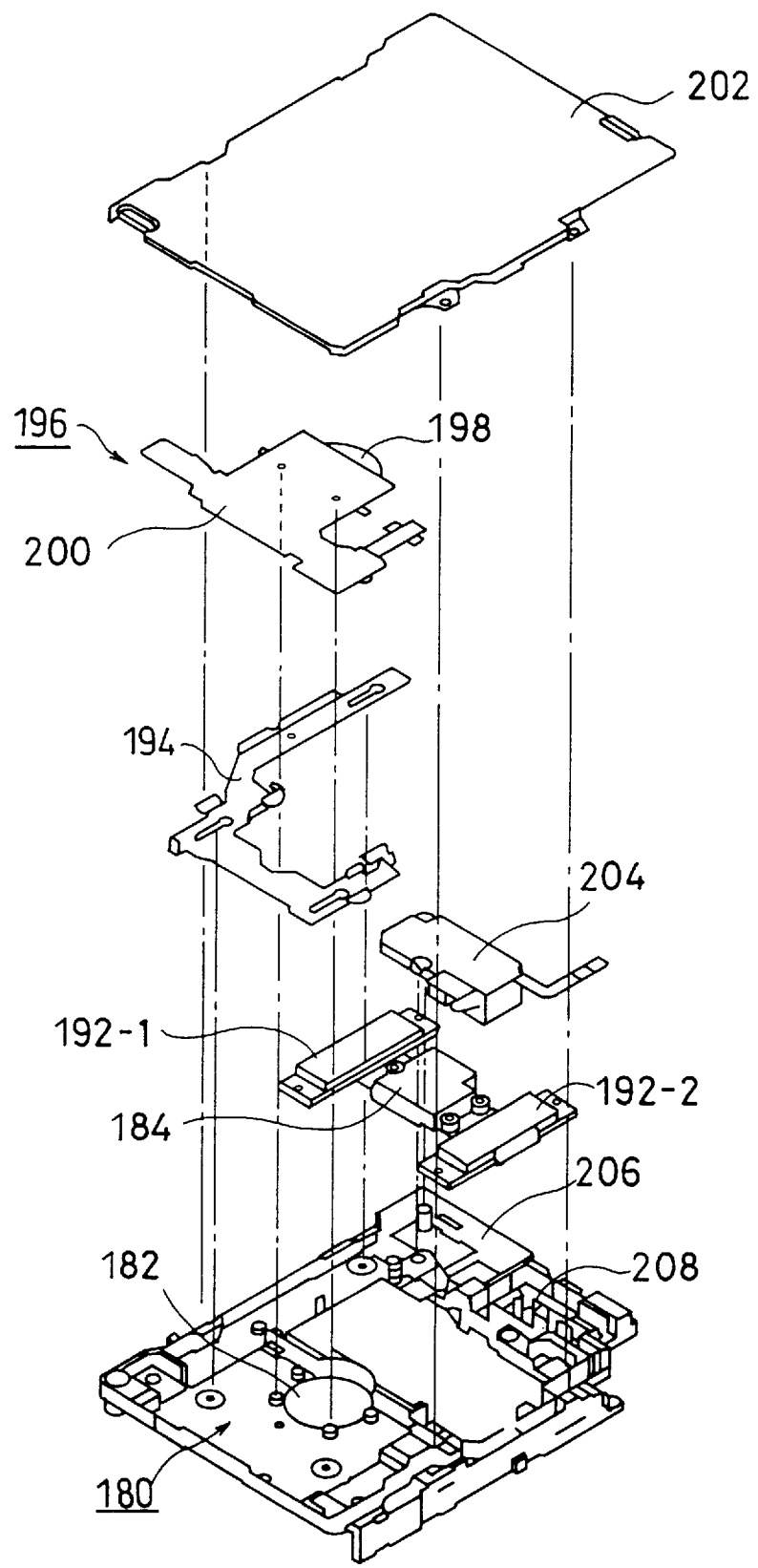
FIG. 3 is an assembly exploded diagram of components elements from a drive casing to a lower side cover in FIG. 2 when they are seen from the bottom.
Figure 5:
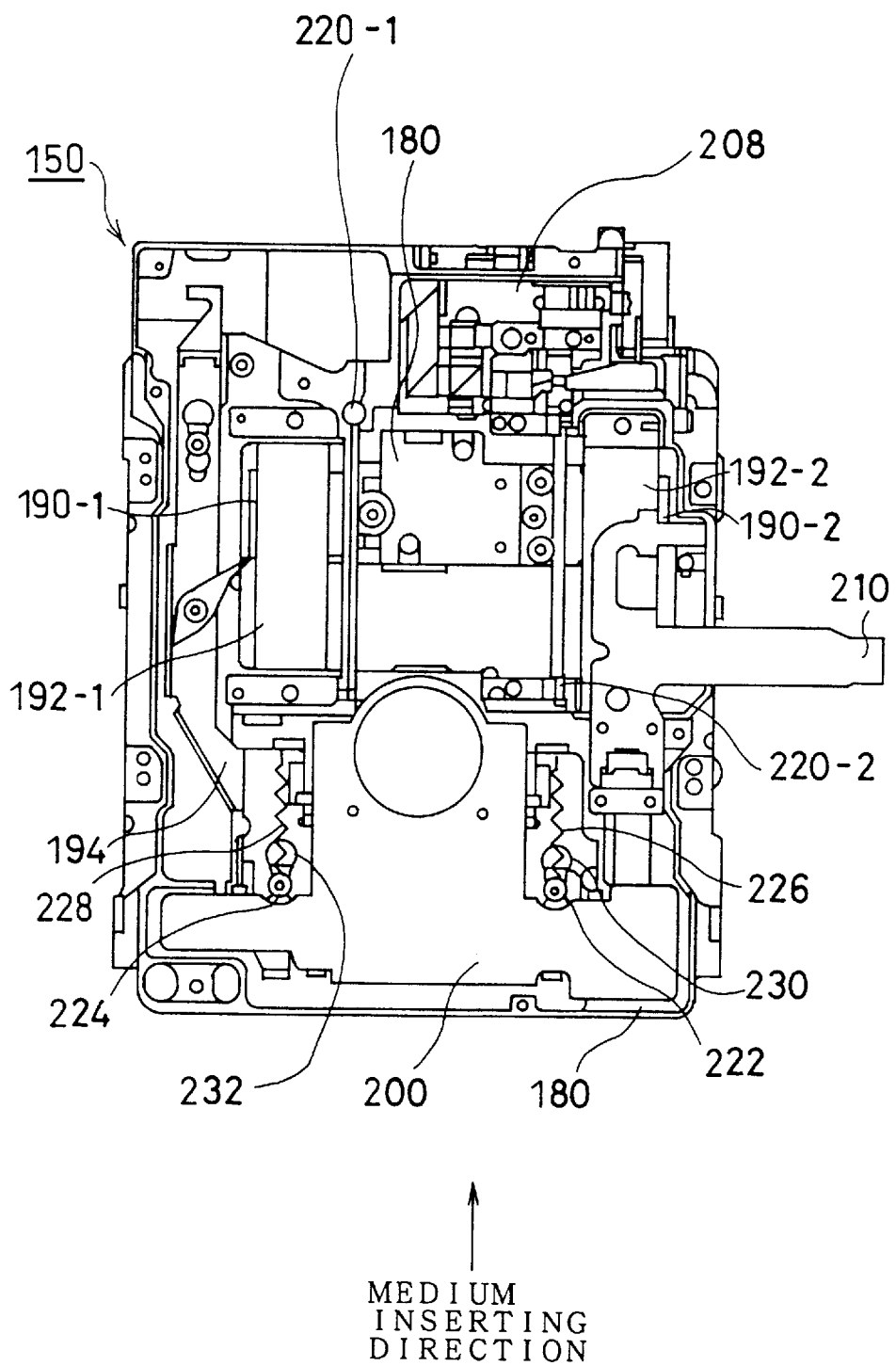
FIG. 5 is a bottom view of the assembling state in FIG. 2.

FIG. 5 shows a rear side of the drive main body 150 in FIG. 1 and shows a state in which the cover 202 in FIG. 3 is removed. The slide plate 194 is attached to pins 222 and 224 fixed to the drive base 180 so as to be slidable in the medium inserting direction by guide grooves 230 and 232. The slide plate 194 is further urged to the medium inserting side by coil springs 226 and 228. Therefore, when the MO cartridge is inserted from the medium insertion port side serving as a lower side of the diagram, the slide plate 194 integratedly moves and is locked at a position where the lower sides of the guide grooves 230 and 232 are come into contact with the pins 222 and 224. In this state, the medium hub is attached to the turntable. The fixed optical unit 208 is provided on the upper side of the diagram which faces the lens carriage 184. A laser diode, a detector for recording and reproduction, detectors for tracking control and focusing control, and further, their optical system are assembled in the fixed optical unit 208.

FIG. 6 shows a lens actuator 60 mounted on the lens carriage 184 in FIG. 2. In the lens actuator 60, four wires 304-1 to 304-4 (304-4 is not shown) are supported to a side surface of a holding portion 302 attached to a fixed base 300 in a cantilever state and a movable base 306 is supported at four points to edges of the wires 304-1 to 304-4. Therefore, the movable base 306 has a 3-dimensional degree of freedom for the holding portion 302 serving as a fixed side by a bending of the four wires 304-1 to 304-4. The objective lens 186 is mounted on the movable base 306 and converges a light beam having a beam optical axis 305 from the fixed optical unit which was reflected by the lower portion, thereby forming an image onto the medium surface locating upward. The objective lens 186 returns the return light from the medium to the fixed optical unit by the same path. A tracking coil 308 and a focusing coil 310 are mounted on the movable base 306. The tracking coil 308 is located so as to wind a horizontal portion on the lower side of a yoke 312 provided for the fixed base 300. By supplying a current to the coil, the tracking coil 308 moves the objective lens 186 in the outer direction shown by an arrow 314 or the inner direction shown by an arrow 316 through the movable base 306. The focusing coil 310 is Located so as to wind a vertical portion of the yoke 312. By supplying a current to the coil, the focusing coil 310 moves the objective lens 186 in the vertical direction through the movable base 306. In order to make the apparatus thin, a lens position sensor for detecting a positional deviation of a lens optical axis of the objective lens 186 for the beam optical axis 305 from the fixed optical system is not provided for the lens actuator 60. A lens position signal of the objective lens 186 is falsely formed on the basis of a tracking error signal which is derived from a photosensitive output of the return light from the medium. The lens position signal (LPOS) falsely formed from the tracking error signal is used for lens lock control to drive the lens actuator 60 so as to keep the lens positional deviation for the beam optical axis to zero in a high speed seek in which a carriage movement by the VCM is mainly performed. The signal LPOS is also used for lens lock control to drive the carriage by the VCM so as to keep the positional deviation of the optical axis of the objective lens in a low speed seek in which the lens actuator 60 is mainly used.

[Circuit construction]

Figure 7B:
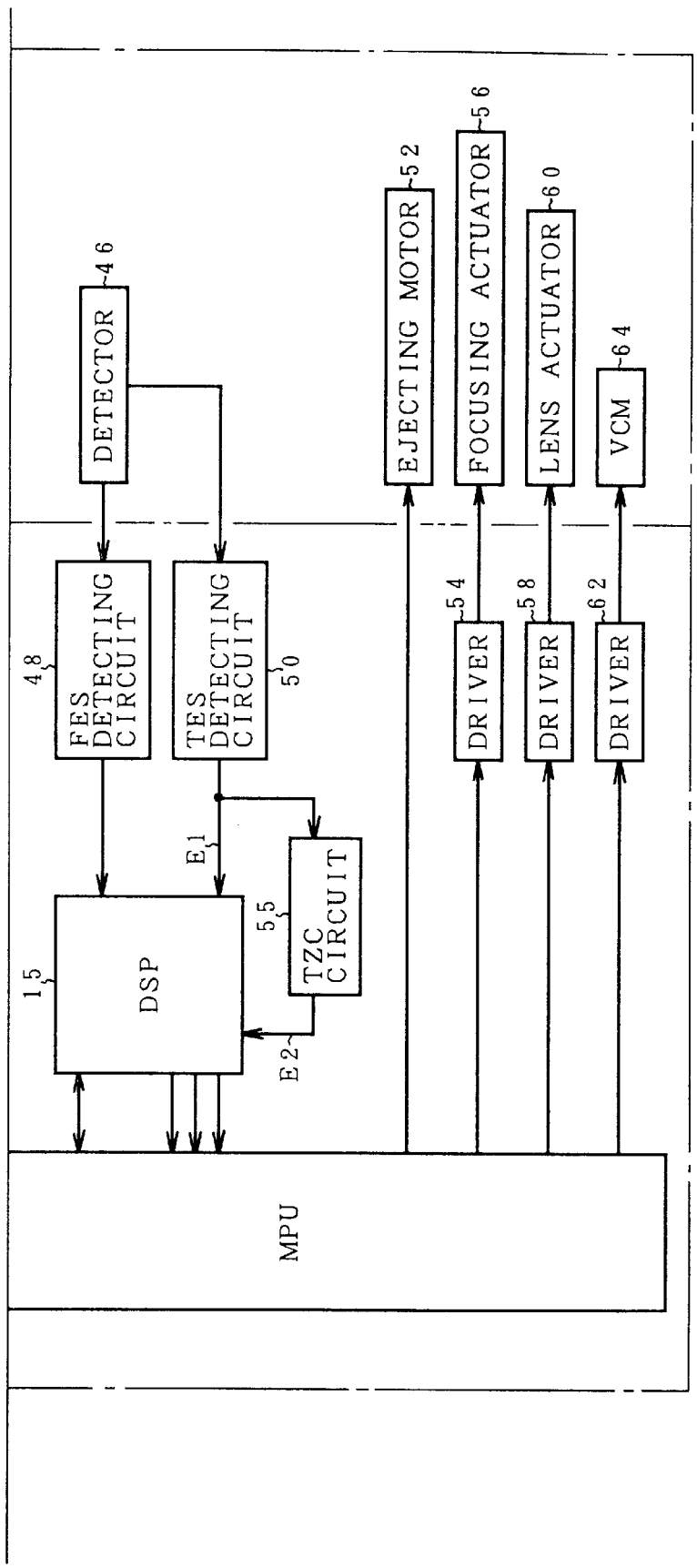

FIGS. 7A and 7B are circuit block diagrams on the side of a controller and an enclosure which are provided for the drive main body 150 in FIG. 1. An optical disk drive of the invention is made up of a controller 10 and an enclosure 12. The controller 10 has: an MPU 14 for performing a whole control of the optical disk drive; an interface controller 16 for transmitting and receiving a command and data to/from an upper apparatus; a formatter 18 for performing processes necessary to write and read data to/from the medium; and a buffer memory 20. In the embodiment, the buffer memory 20 is commonly used by the MPU 14, interface controller 16, and formatter 18. An encoder 22 and a laser diode control circuit 24 are provided as a writing system for the formatter 18. A control output of the laser diode control circuit 24 is supplied to a laser diode unit 30 provided for an optical unit on the enclosure 12 side. The laser diode unit 30 integratedly has a laser diode and a photosensitive device for monitoring. In the embodiment, either a medium of 128 MB or a medium of 230 MB can be used as an MO cartridge medium to record and reproduce by using the laser diode unit 30. A pit position recording (PPM recording) is used as a recording system in this case. A ZCAV (zone constant acceleration system) is used as a recording format of the medium. The 128 MB medium is set to one zone. The 230 MB medium is set to ten zones. A decoder 26 and a read LSI circuit 28 are provided as a reading system for the formatter 18. The photosensitive signal of the return light of the beam from the laser diode 30 by a detector 32 provided for the enclosure 12 is inputted to the read LSI circuit 28 as an ID signal and an MO signal through a head amplifier 34. The read LSI circuit 28 has circuit functions of an AGC circuit, a filter, a sector mark detecting circuit, a synthesizer, a PLL, and the like. The read LSI circuit 28 forms a read clock and read data by the inputted ID signal and MO signal and transmits them to the decoder 26. Since the zone CAV is used as a recording system of the medium by a spindle motor 40, a switching control of a clock frequency corresponding to the zone for the built-in synthesizer is performed for the read LSI circuit 28 by the MPU 14. A detection signal of a temperature sensor 36 provided on the enclosure 12 side is inputted to the MPU 14. On the basis of a temperature in the apparatus detected by the temperature sensor 36, the MPU 14 controls each of light emitting powers for reading, writing, and erasing in the laser diode control circuit 24 to optimum values. The MPU 14 controls the spindle motor 40 provided for the enclosure 12 by a driver 38. Since a recording format of the MO cartridge medium is the zone CAV, the spindle motor 40 is rotated at a constant speed of, for example, 2700 r.p.m. The MPU 14 controls the electromagnet 44 provided on the enclosure 12 side through a driver 42. The electromagnet 44 is arranged on the reverse side of the beam irradiating side of the loaded MO cartridge medium and applies an external magnetic field to the medium in the recording mode and erasing mode.

A DSP 15 constructs a servo system of the tracking control and focusing control of the objective lens mounted on the lens carriage. For this purpose, a 2-split detector 46 to receive the return light of the beam from the medium is provided for the optical unit on the enclosure 12 side. An FES detecting circuit (focusing error signal detecting circuit) 48 forms a focusing error signal from the photosensitive output of the 2-split detector 46 and supplies to the DSP 15. A TES detecting circuit (tracking error signal detecting circuit) 50 forms a tracking error signal E1 from a photosensitive output of the 2-split detector 46 and supplies to the DSP 15. Further, the tracking error signal E1 is supplied to a zero-crossing point detecting circuit (TZC circuit) 55. A tracking zero-crossing pulse signal E2 obtained by detecting a zero-crossing point of the tracking error signal E1 is inputted to the DSP 15. The DSP 15 executes various operations for a focusing servo and a tracking servo and outputs operation results to the MPU 14. On the basis of the operation results of the DSP 15, the MPU 14 drives a focusing actuator 56 through a driver 54, drives the lens actuator 60 through a driver 58, and further, drives a VCM 64 of the lens carriage through a driver 62. Further, the MPU 14 can also drive an ejecting motor 52 in accordance with an ejection switch.

In the optical disk drive of FIGS. 7A and 7B, a lens position sensor to detect a position of the lens actuator on the lens carriage, a position detecting device (PSD) to detect a moving position of the lens carriage, and the like are not used. As a tracking servo system which is realized by the DSP 15, there are a speed servo system for a seek control and a position servo system for an on-track control. The speed servo system for the seek control is classified into a long seek in the case where the number of moving tracks to the target track is large and a short seek in the case where the number of moving tracks to the target track is small. The short seek is a low speed seek control in which the driving of the lens actuator 60 is mainly performed. In this instance, a lens lock control to drive the VCM 64 for a lens lock to hold an optical axial deviation amount of the objective lens to zero. In the long seek, a high speed seek control in which the driving of the VCM 64 is mainly performed is first performed and, when the number of remaining tracks to the target track reaches a specified value, the control mode is switched to the low speed seek control in which the driving of the lens actuator 60 is mainly performed. In the high speed seek control in which the driving of the VCM 64 is mainly performed, a lens lock control to drive the lens actuator 60 for a lens lock to hold the optical axial deviation amount of the objective lens to zero is executed. Each of the low speed seek control in which the lens actuator 60 is mainly driven in the short seek and the high speed seek control in which the VCM 64 is mainly driven in the long seek is a speed control for controlling so that the actual measured velocity follows a target velocity in accordance with the number of remaining tracks to the target track. The speed control has speed profiles of an acceleration period, constant speed period, and a deceleration period. Among them, with respect to waveforms of an acceleration current upon acceleration and a deceleration current upon deceleration, since the lens lock control cannot be performed because a pseudo lens position signal cannot correctly be obtained at this stage, the acceleration current and deceleration current are smoothly changed, thereby suppressing a large fluctuation of the lens position due to sudden acceleration and deceleration. At the same time, a current for inertia compensation according to the acceleration on the driving side serving as a main drive is supplied to the auxiliary driving side, thereby suppressing a fluctuation of the lens position by the acceleration or deceleration. Thus, even at the time of acceleration or deceleration in which no pseudo lens position signal is derived, a lens locking state can be guaranteed. That is, in the optical disk drive having no lens position sensor, for example, in the high speed seeking mode in which the VCM 64 is mainly driven, an acceleration similar to that of the carriage is applied to the lens actuator 60, thereby preventing the occurrence of a relative displacement of the lens actuator 60 in association with the movement of the carriage. When the carriage is activated by the VCM 64, the carriage is gently moved so as not to cause an oscillation of the lens actuator 60. By the above method, in the high speed seek control by the driving of the VCM 64, a lens locking state in which the optical axial deviation of the objective lens of the lens actuator is always held to zero can be maintained. Specifically speaking, the DSP 15 controls the VCM 64 by an acceleration activation control method such as to minimize a structural vibration in a manner such that a sudden acceleration or deceleration pulse is not applied to the VCM 64 when the lens carriage is moved by the VCM 64. As a target orbit of the acceleration activation control in this case, an ideal model is presumed and a polynomial of each of the acceleration, speed, and movement distance showing a target driving profile is formed. For example, at the time of the seeking operation of the carriage, a target acceleration and a target velocity are calculated on the basis of the position of the carriage and the movement distance in the seeking operation of the carriage, and it is sufficient to supply a seek current for acceleration which gently changes to the VCM 64 on the basis of the operation result. A target orbit of the acceleration and deceleration control is also similarly determined. Further, as for the low speed seek control in which the lens actuator 60 is mainly driven, an acceleration orbit control and an acceleration deceleration control according to the profile of the target orbit determined by presuming a similar ideal model are executed. The DSP 15 has a circuit function to form the pseudo lens position signal which is used for the lens lock control during the seek on the basis of the tracking error signal E1. The pseudo lens position signal can be fundamentally detected by detecting an offset of the tracking error signal when the optical axis of the objective lens is deviated from the beam optical axis. However, a frequency of the tracking error signal E1 which is determined by a passing speed when the beam passes over the tracks in the high speed seek and that in the low speed seek are largely different. When using a single detecting function, the pseudo lens position signal can be detected only in one case. In the invention, therefore, a detecting algorithm or the switching between the detecting functions in the low speed seek and the high speed seek is realized so that both of the high speed seek and the low speed seek can be satisfied.

[Seek control]

Figure 8:
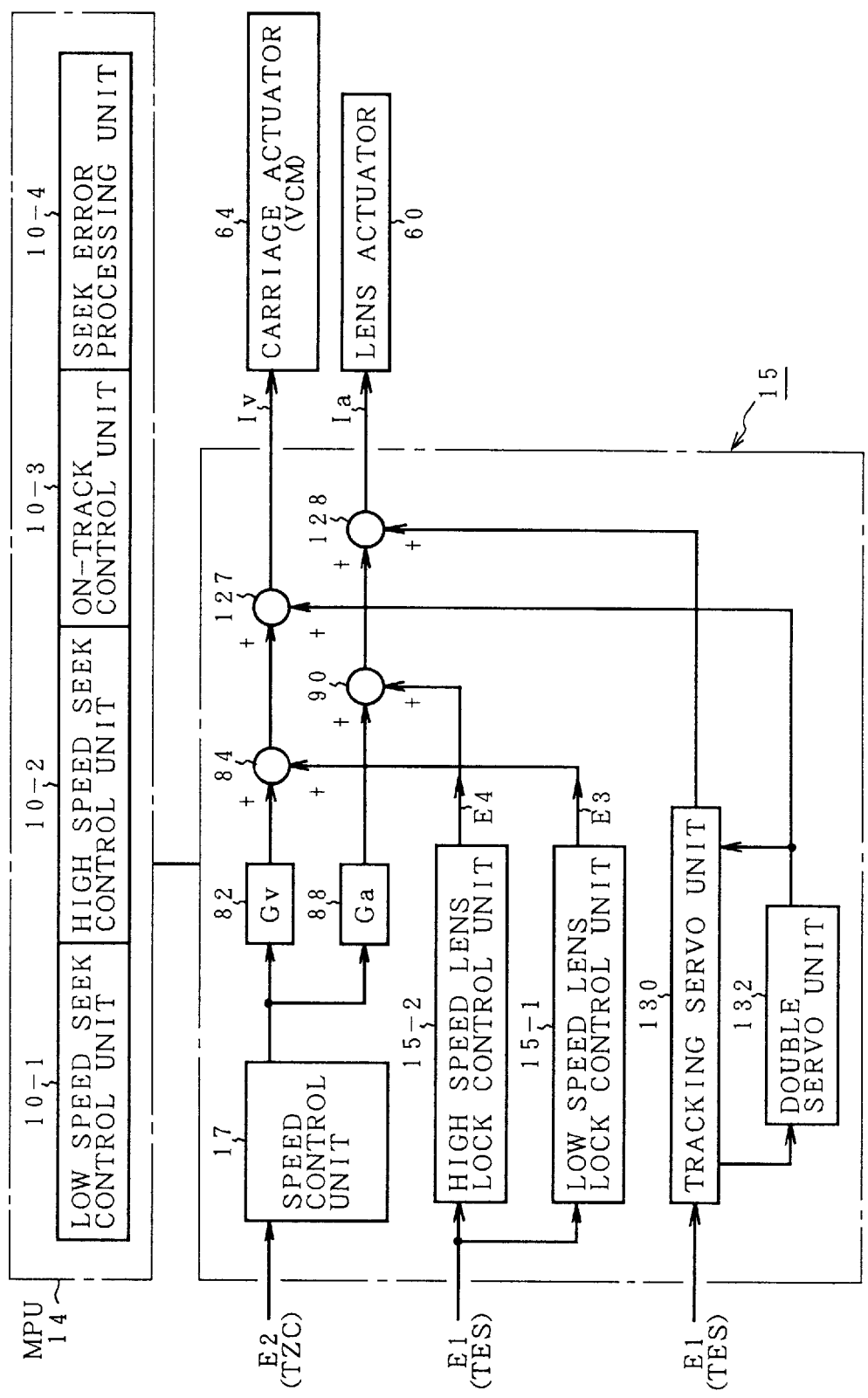
FIG. 8 is a functional block diagram of a seek control unit of the invention.

FIG. 8 is a functional block diagram of the seek control of the invention which is realized by the controller 10 provided for the optical disk drive in FIGS. 7A and 7B. The seek control of the invention is realized by using the servo system for the lens actuator 60 and carriage actuator 64 provided for the DSP 15 under controls of a low speed seek control unit 10-1 and a high speed seek control unit 10-2 provided for the MPU 14. The low speed seek control unit 10-1 of the MPU 14 is activated when the number of remaining tracks to the target track designated by a seek command from an upper apparatus is less than a predetermined value, for instance, 50 tracks, thereby performing the low speed seek control. On the other hand, the high speed seek control unit 10-2 is activated when the number of remaining tracks to the target track designated by the seek command is equal to or larger than, e.g., 50 tracks, thereby performing the high speed seek control. The number of remaining tracks to the target track at which the low speed seek control unit 10-1 and high speed seek control unit 10-2 are switched is arbitrarily determined. Specifically speaking, it is sufficient to decide the number of tracks corresponding to the maximum movement amount of the beam on the medium surface when the optical axis of the objective lens 186 is moved from the neutral position which coincides with the beam optical axis 305 of the fixed optical system to the inner side or outer side by the lens actuator 60 in FIG. 6. A beam movement amount on the medium surface by the movement of the objective lens 186 is equal to, for example, about 100 μm. Now, assuming that a track pitch is set to about 2 μm, for example, it is sufficient to set 50 tracks as a specified value and to switch the low speed seek and the high speed seek. As mentioned above, the number of tracks when switching the low speed seek and the high speed seek is properly decided by the beam movement amount by the lens actuator and a track density of the medium. A speed control unit 17 is provided for the DSP 15. A control signal from the speed control unit 17 is inputted to gain setting devices 82 and 88, respectively. A gain Gv is set into the carriage actuator 64 and a gain Ga is set into the lens actuator 60. After that, gain set signals from the gain setting devices 82 and 88 are supplied to the VCM 64 serving as a carriage actuator and the lens actuator 60 through addition points 84 and 90, respectively. During the low speed seek by the low speed seek control unit 10-1, the speed control unit 17 realizes the low speed seek control in which the lens actuator 60 is mainly driven. Specifically speaking, a current according to a speed deviation obtained as a deviation between the target velocity and the actual measured velocity in the speed control unit 17 is set to Ia and is supplied as it is to the lens actuator 60. On the other hand, by adjusting a gain of the gain setting device 82, a current Iv for inertia compensation is supplied to the VCM 64 with respect to the acceleration and deceleration, thereby allowing the motion of the carriage to trace the motion of the lens actuator 60 by the VCM 64 and preventing the occurrence of the optical axial deviation of the objective lens. As an acceleration current or a deceleration current which is supplied to the lens actuator 60 at the time of the acceleration or deceleration, a conventional acceleration or deceleration current of a rectangular wave is not used but an acceleration current or deceleration current whose current value is increased or decreased step by step is supplied, thereby allowing a smooth acceleration to be executed. On the other hand, in the high speed seeking mode by the high speed seek control unit 10-2, the speed control unit 17 supplies the current obtained in accordance with the speed deviation between the target velocity and the actual measured velocity of the light beam as Iv to the VCM 64 as it is, thereby allowing the high speed seek of the carriage to be carried out. In this instance, by adjusting the gain Ga of the gain setting device 88, the current Ia for allowing the lens actuator 60 to trace the acceleration or deceleration of the carriage by the VCM 64 is supplied to the lens actuator 60. As for the current in each of the acceleration and the deceleration of the VCM 64 as well, the smooth acceleration and deceleration are executed by providing a current profile in which the current value is increased or decreased step by step. Further, in the high speed seek control unit 10-2, when the number of remaining tracks to the target track reaches, for example, 50 tracks during the high speed seek, the control is transferred to the low speed seek control unit 10-1 and the seeking mode is switched from the high speed seek to the low speed seek. In the low speed seek in this case as well, the same seek control as the ordinary low speed seek in the case where the number of tracks to the target track by the seek command is less than 50 tracks is performed. A low speed lens lock control unit 15-1 and a high speed lens lock control unit 15-2 are provided for the DSP 15 in correspondence to the low speed seek control unit 10-1 and high speed seek control unit 10-2 of the MPU 14. The low speed lens lock control unit 15-1 is activated in the low speed seek control, falsely forms a lens position signal E3 from the tracking error signal E1 which is obtained during the low speed seek, adds the signal E3 to the addition point 84 for the VCM 64, and executes the lens lock control during the low speed seek. The high speed lens lock control unit 15-2 is activated in the high speed seek control, likewise forms a pseudo lens position signal E4 on the basis of the tracking error signal E1 which is obtained during the high speed seek, adds the signal E4 to the addition point 90 on the lens actuator 60 side, and performs the lens lock control. In the low speed lens lock control unit 15-1 and high speed lens lock control unit 15-2, the correct lens position signals E3 and E4 are not obtained with respect to the acceleration and deceleration in each seek control. Therefore, for constant speed control periods of time after completion of the acceleration during the low speed seek control and high speed seek control, the lens lock control is performed by using the correct lens position signals E3 and E4 which are obtained from the tracking error signal E1. An on-track control unit 10-3 and a seek error processing unit 10-4 are provided for the MPU 14. In correspondence to them, a tracking servo unit 130 and a double servo unit 132 are provided for the DSP 15. When the light beam reaches the target track by the low speed seek control unit 10-1, the on-track control unit 10-3 pulls in the light beam to the target track, thereby on-tracking. That is, the on-track control unit 10-3 turns on the tracking servo unit 130 of the DSP 15 and drives the lens actuator 60 so as to set the tracking error signal E1 to zero through an adder 128, thereby allowing the light beam to trace the track center. Simultaneously with the on-track control, the on-track control unit 10-3 turns on the double servo unit 132 of the DSP 15 and the carriage is allowed to trace the motion of the objective lens by the lens actuator 60 by the driving of the VCM 64 through the adder 128, thereby setting the optical axial deviation amount to zero. Although the lens position detection signal is ordinarily necessary for the control of the double servo unit 132, the optical disk drive of the invention doesn't have the lens position sensor. Therefore, the double servo unit 132 receives a lens actuator drive current of the tracking servo unit 130, predicts the motion of the objective lens, obtains the optical axial deviation amount of the objective lens, and drives the VCM 64 so as to set the optical axial deviation amount to zero, thereby allowing the carriage to trace the motion of the objective lens. Further, the seek error processing unit 10-4 is provided for the MPU 14. When the low speed seek control unit 10-1 detects the arrival at the target track and the pull-in of the light beam to the target track by the turn-on of the tracking servo unit 130 fails and the seek error is detected, the seek error processing unit 10-4 turns on the low speed lens lock control unit 15-1 or high speed lens lock control unit 15-2 and performs the lens lock control so as to set the optical axial deviation of the objective lens to zero and allows a retry seek to be executed after that. That is, as a first embodiment, when the seek error is detected, the seek error processing unit 10-4 turns on the low speed lens lock control unit 15-1 and controls so as to set the optical axial deviation amount of the objective lens to zero by the driving of the VCM 64 by using the lens position signal which was falsely obtained from the offset of the tracking error signal. As a second embodiment, when the seek error is detected, the seek error processing unit 10-4 turns on the high speed lens lock control unit 15-2 and controls so as to set the optical axial deviation amount of the objective lens to zero by the driving of the lens actuator 60 by using the lens position signal which was falsely derived from the offset of the tracking error signal. By such a lens lock control by the seek error processing unit 10-4 at the time of the detection of the seek error, the optical axial deviation of the objective lens when the seek error occurs is suppressed, the subsequent retry to pull-in is enabled, and the control mode can be promptly shifted to the retry seek.

Figure 9A:
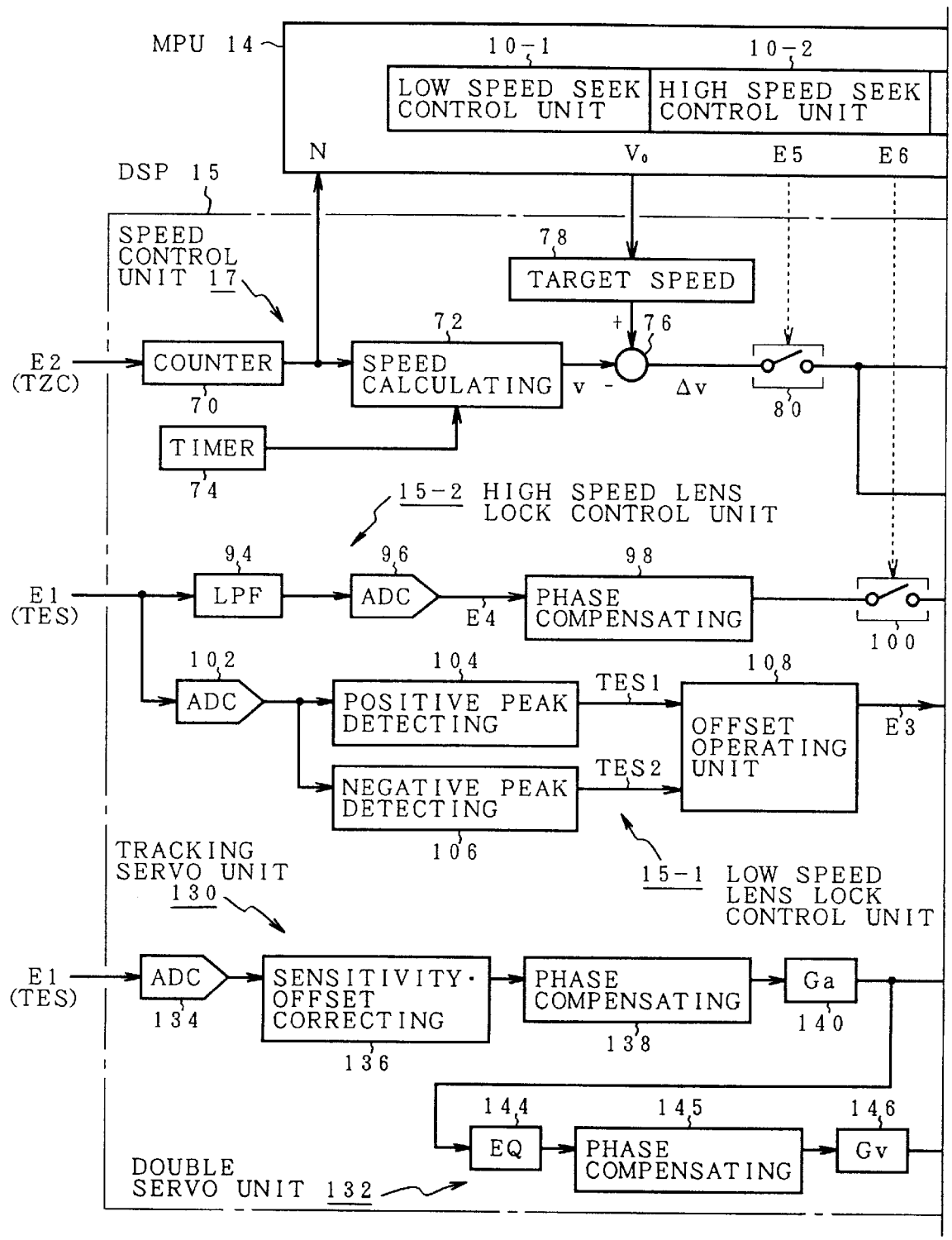
FIGS. 9A and 9B are block diagrams of the first embodiment of the seek control unit in FIG. 8.
Figure 9B:
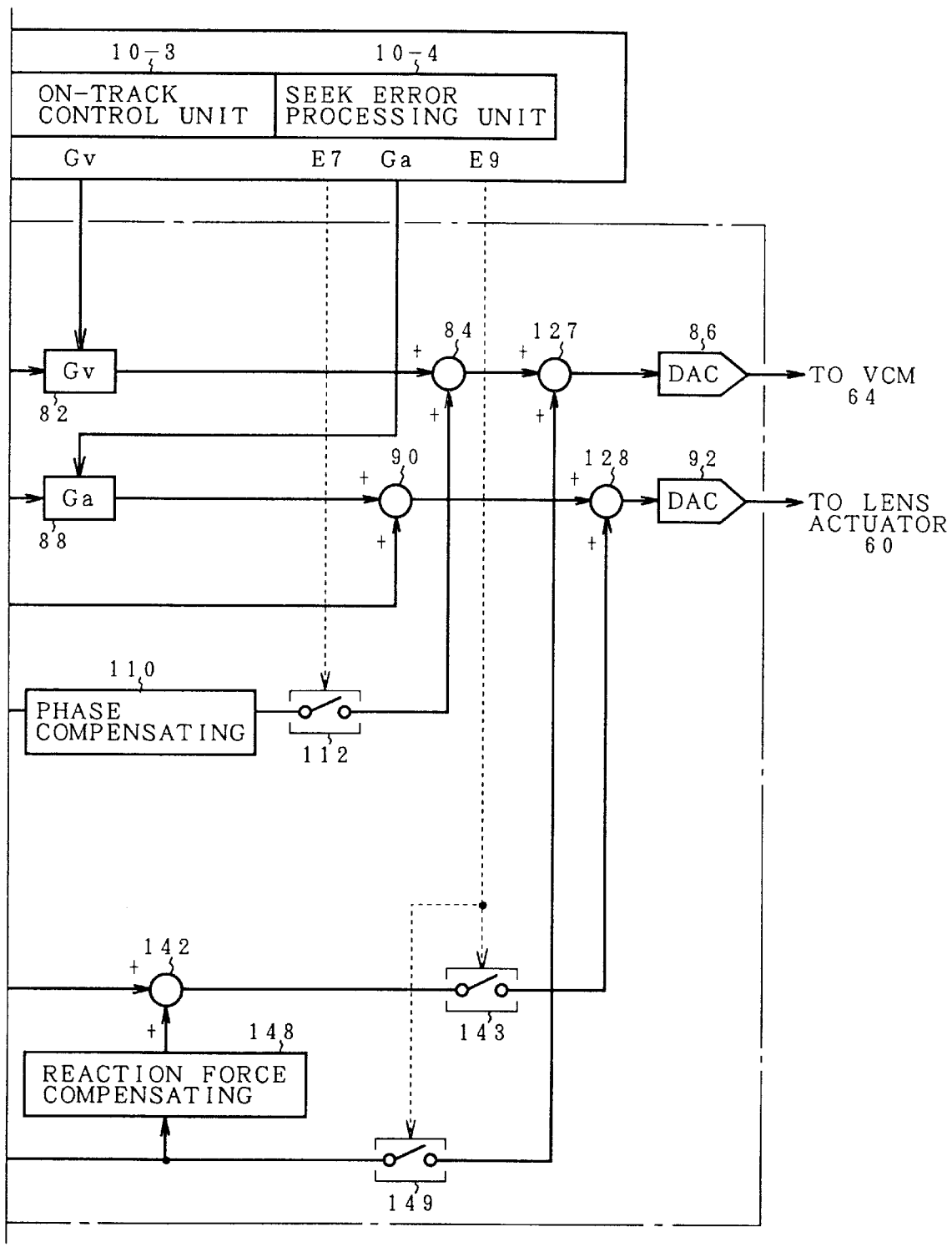

FIGS. 9A and 9B are block diagrams of the first embodiment on the DSP 15 side in FIG. 8. First, the speed control unit 17 of the DSP 15 is made up of a counter 70, a timer 74, a speed calculating unit 72, a target speed register 78, an adder 76, and a servo switch 80. The counter 70 counts the number of track zero-crossing pulses E2 derived from the track zero-crossing point detecting circuit (TZC circuit) 55 provided for the controller 10 in FIG. 8, thereby obtaining a track number of the track where the light beam is located at present in a real-time manner. A count value of the counter 70 indicative of the present track position is inputted as a track number N to the MPU 14. When receiving the seek command from the upper apparatus, therefore, the MPU 14 can recognize the number of remaining tracks to the target track and the seeking direction on the inner side or outer side from a difference between the number N0 of the target track and the number N of the present track that was derived by the counter 70. The speed calculating unit 72 counts a counting period of the track zero-crossing pulse by the counter 70 by a timer clock from the timer 74 and calculates a velocity V of the beam as a reciprocal number of the count period. A target velocity v0 read out from the target speed table in accordance with the number of tracks to the target track is set into the target speed register 78 by the low speed seek control unit 10-1 or high speed seek control unit 10-2 activated at that time in the MPU 14. The adder 76 subtracts a measured velocity v of the light beam calculated by the speed calculating unit 72 from the target velocity v0 set in the target speed register 78 and outputs a velocity deviation Δv. A servo switch 80 provided subsequent to the addition point 76 is held ON during the seek control by a control signal E5 of the MPU 14. Gains Gv and Ga are set from the MPU 14 side into the gain setting devices 82 and 88 provided in parallel subsequent to the servo switch 80. Upon gain setting, in the low speed seek control, the gain Ga for supplying the current Ia according to the velocity deviation Δv to the lens actuator 60 is set into the gain setting device 88. At the same time, the gain Gv for supplying the current Iv for inertia compensation of the VCM 64 is set into the gain setting device 82. On the contrary, in the high speed seek control, the gain Gv for supplying the current Iv corresponding to the velocity deviation Δv is set into the gain setting device 82. At the same time, the gain Ga for supplying the current Ia for inertia compensation to the lens actuator 60 is set into the gain setting device 88. The low speed lens lock control unit 15-1 is made up of an A/D converter 102, a positive peak detecting unit 104, a negative peak detecting unit 106, an offset operating unit 108, a phase compensating unit 110, and a servo switch 112. The high speed lens lock control unit 15-2 is made up of a low pass filter (LPF) 94, an A/D converter (ADC) 96, a phase compensating unit 98, and a servo switch 100. In the low speed seek control, the servo switch 100 is turned off by a control signal E6 from the MPU 14, the servo switch 112 is turned on by a control signal E7 from the MPU 14, and the control of the low speed lens lock control unit 15-1 is validated. On the other hand, in the high speed seek control, the servo switch 100 is turned on, the servo switch 112 is turned off, and the control of the high speed lens lock control unit 15-2 is validated. The detection of the pseudo lens position signal based on the tracking error signal E1 in the low speed lens lock control unit 15-1 and high speed lens lock control unit 15-2 will now be described.

Figure 10A:
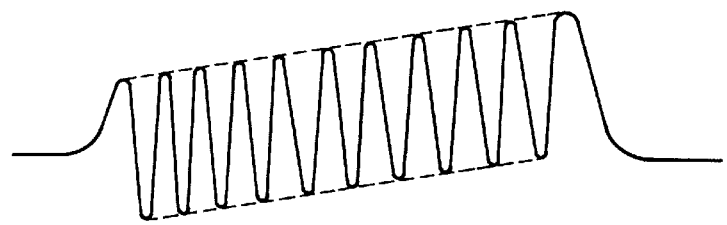
FIGS. 10A and 10B are diagrams of signal waveforms of a tracking error signal and a pseudo lens position signal when an objective lens is deviated from a beam optical axis at a low speed.
Figure 10B:

FIGS. 10A and 10B are signal waveform diagrams of the tracking error signal E1 when the lens actuator 60 is slowly driven at a constant speed in a stop state of the carriage and the pseudo lens position signal E3 that is detected. As for the tracking error signal E1 in FIG. 10A, when the objective lens 186 is moved at a constant speed to the outer side shown by, for example, the arrow 314 by supplying a current to the tracking coil 308 of the lens actuator 60 in FIG. 6, the lens optical axis is deviated for the beam optical axis 305. By the movement of the objective lens 186, the light beam traverses the tacks on the medium locating upward at a constant slow speed. In this instance, when the objective lens 186 moves while making the optical axis of the objective lens 186 coincide with the beam optical axis 305, the tracking error signal E1 causes an amplitude change which is symmetrical with respect to the upper and lower positions around the zero level as a center. However, since the optical axis of the objective lens 186 is deviated from the beam optical axis 305 by the driving of only the lens actuator 60, an offset according to the deviation amount of the optical axis occurs as shown in FIG. 10A. It is sufficient that the offset according to the deviation amount of the lens optical axis of the tracking error signal E1 is detected as a change amount of a straight line connecting the peak on the + side of the tracking error signal E1 or a straight line connecting the peak on the – side. Thus, the offset amount according to the optical axial deviation of the lens of the tracking error signal E1 can be detected as a pseudo lens position signal E3 as shown in FIG. 10B.

In this case, at the time of the first acceleration when the lens actuator is activated and the last deceleration, since a frequency of the tracking error signal E1 largely changes, as for the unit component, the pseudo lens position signal E3 becomes a noise and cannot be used. Therefore, it is desirable not to use the pseudo lens position signals E3 at the time of the acceleration just after the activation and the deceleration just before the activation.

In the first embodiment of FIGS. 9A and 9B, as a process to detect the pseudo lens position signal E3 from the tracking error signal E1 in FIG. 10A corresponding to the low speed seeking mode, the positive peak value and negative peak value of every cycle of the tracking error signal are detected, an offset value is detected as a value that is equal to the half of a difference between the positive and negative peak values, and this offset value is used as a lens position signal E3.

Figure 11A:
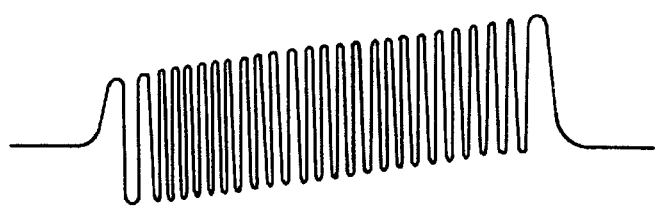
FIGS. 11A and 11B are diagrams of signal waveforms of a tracking error signal and a pseudo lens position signal when an objective lens is deviated from a beam optical axis at a high speed.
Figure 11B:

FIGS. 11A and 11B are signal waveform diagrams of the tracking error signal E1 and pseudo lens position signal E4 when the lens actuator 60 is moved at the same high speed as that in the high speed seek by the VCM 64 in the stop state of the carriage. The frequency of the tracking error signal E1 which is obtained by the movement of the lens actuator 60 corresponding to the high speed seeking mode is so high to be, for instance, tens of kHz. On the other hand, the frequency of the tracking error signal E1 corresponding to the low speed seeking mode shown in FIGS. 10A and 10B is set to a low frequency below, for example, 10 kHz, for instance, 8 kHz. Therefore, it is difficult to detect the lens position signal by the same process in both of the low speed seek and the high speed seek. In the first embodiment of FIGS. 9A and 9B, accordingly, in the high speed seeking mode, by transmitting the tracking error signal E1 in FIG. 11A through the low pass filter 94 in FIGS. 9A and 9B and merely eliminating the high frequency component, the pseudo lens position signal E4 having the offset corresponding to the optical axial deviation of the objective lens of the tracking error signal E1 as shown in FIG. 11B is detected. A cut-off frequency of the LPF 94 which is used for the high speed seek is set to, for example, 8 kHz. Therefore, even if the LPF 94 is used to detect the lens position signal in the low speed seeking mode, the tracking error signal E1 in the low speed seeking mode having a band below the cut-off frequency in FIG. 10A passes as it is through the LPF 94 and the pseudo lens position signal E3 as shown in FIG. 10B cannot be derived. In the first embodiment of FIGS. 9A and 9B, therefore, by providing the detecting function of the lens position signal corresponding to each of the frequencies in the high speed seek and low speed seek, in any one of the low speed seeking mode and the high speed seeking mode, the stable lens position signal E3 or E4 can be obtained for the constant speed period of time excluding the acceleration and deceleration periods before and after the constant speed period.

Referring again to FIGS. 9A and 9B, the pseudo lens position signal E3 obtained by the offset operating unit 108 in the low speed seeking mode is subjected to an advance phase compensation to increase a high band gain by the phase compensating unit 110. After that, the phase compensated signal is added to an inertia compensation current for the VCM 64 by the adder 84 through the servo switch 112 in the ON state in the low speed seeking state. The carriage is moved by the VCM 64 so as to trace the motion of the lens actuator 60 during the low speed seeking operation, thereby applying the lens lock to maintain the deviation of the lens optical axis for the beam optical axis to zero. Similarly, with respect to the high speed lens lock control unit 15-2 side as well, the pseudo lens position signal E4 obtained by the LPF 94 is converted into the digital data by the A/D converter 96. After that, the digital data is phase compensated by the phase compensating unit 98 and is supplied to the adder 90 through the servo switch 100 which is in the ON state in the high speed seeking mode. The digital data is added to an inertia compensation current outputted from the gain setting device 88 in the high speed seeking mode and drives the lens actuator 60, thereby performing a lens locking operation to set the deviation of the lens optical axis for the beam optical axis to zero.

Figure 12:
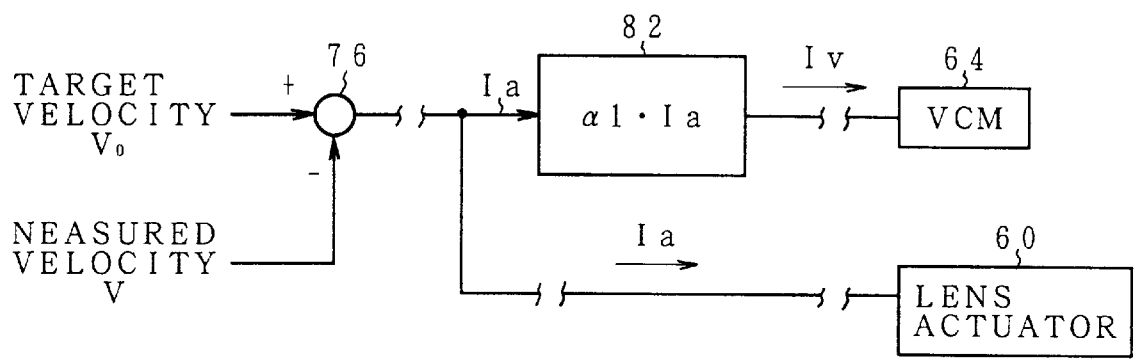
FIG. 12 is an explanatory diagram of an inertia compensation of a carriage by a VCM in a low speed seeking mode by the driving of the lens actuator.

FIG. 12 is an explanatory diagram of the gain setting for the gain setting device 82 to supply the inertia compensation current to the VCM 64 in the low speed seek control. During the low speed seeking operation, the current Ia is supplied to the actuator 60 by the gain Ga which is set by the gain setting device 88 (not shown) in accordance with a velocity deviation Δv between the target velocity v0 and the measured velocity v from the addition point 76. In this instance, an inertia compensation gain α1 is set into the gain setting device 82 of the VCM 64 for performing the lens lock control. The inertia compensation gain α1 is defined by the following equation.

$$\alpha1=(Kv/Ka)\cdot\{Ma/(Ma+Mv)\} \quad (1)$$

where, Kv: proportional gain of the VCM 64
Ka: proportional gain on the actuator 60 side
Mv: mass of the carriage actuator to drive the VCM 64
Ma: mass of the lens actuator 60

Therefore, the inertia compensation current Iv which is supplied to the VCM 64 in this instance is defined as follows.

$$Iv=\alpha1\cdot Ia \quad (2)$$

Figure 13:
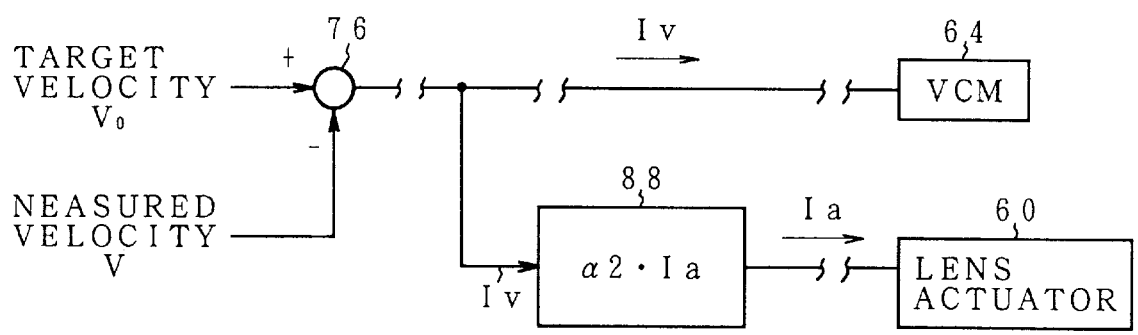
FIG. 13 is an explanatory diagram of an inertia compensation of the lens actuator in a high speed seeking mode by the driving of a carriage by a VCM.

FIG. 13 is an explanatory diagram of the gain setting device 88 on the lens actuator side to supply the inertia compensation current for lens lock control in the high speed seeking mode. In the high speed seek control, the velocity deviation Δv between the target velocity v0 and the measured velocity v is obtained by the addition point 76. The current Iv corresponding to the velocity deviation is obtained by the set gain of the gain setting device 82 (not shown), thereby performing the high speed seek control by the driving of the VCM 64. In this instance, as for the gain setting device 88 on the lens actuator 60 side which is driven for the lens lock control, an inertia compensation coefficient α2 is set. The inertia compensation coefficient α2 is defined by the following equation.

$$\alpha2=(Ka/Kv)\cdot\{Mv/(Ma+Mv)\} \quad (3)$$

Therefore, when the current Iv which is supplied to the VCM 64 is determined by the velocity deviation Δv, the inertia compensation current Ia which is supplied to the lens actuator 60 is unconditionally determined as follows.

$$Ia=\alpha2\cdot Iv \quad (4)$$

The inertia compensation currents for the lens lock control in the low speed seeking mode and high speed seeking mode shown in FIGS. 12 and 13 as mentioned above are fixedly decided by presuming the ideal carriage actuator and lens actuator at the designing stage. Actually, there is a possibility such that an optical axial deviation of the lens occurs due to unpredictable factors such as friction, vibration, and the like. However, since the pseudo lens position signal is correctly obtained not only during the high speed seek but also during the low speed seek, the optical axial deviation of the objective lens can be certainly prevented by the driving of the VCM 64 based on the lens position signal. Thus, by preventing the offset of the tracking error signal during the seeking operation, the track zero-crossing point is accurately detected and a track counting precision can be improved. Since the offset due to the optical axial deviation is not included in the tracking error signal just before the target track, a beam pull-in control to the target track, specifically speaking, the pull-in by the switching to the position servo for setting the tracking error signal to zero can be stably performed at a high speed.

Referring again to FIGS. 9A and 9B, the tracking servo unit 130 is made up of an A/D converter 134, a sensitivity•offset correcting unit 136, a phase compensating unit 138, a gain setting device 140, an adder 142, a servo switch 143, and an addition point 127. The servo switch 143 receives an output when the low speed seek control unit 10-1 of the MPU 14 recognizes the arrival at the target track, the on-track control unit 10-3 is turned on, the pull-in of the light beam to the target track is performed, and the on-track control for allowing the light beam to trace the track center is carried out. The double servo unit 132 is made up of an equalizing filter 144, a gain setting device 146, a reaction force compensating unit 148, a servo switch 149, and the addition point 128. When the pull-in to the target track is successful and the seeking operation is completed, the on-track control unit 10-3 turns on the servo switch 149, predicts a motion of the lens actuator 60 from the drive current I$a$ of the driver 62 in association with the on-track control, and obtains an optical axial deviation amount (relative value indicative of the optical axial deviation amount from the present position) of the objective lens. The drive current I$v$ is supplied to the VCM 64 so as to set the optical axial deviation amount to zero, thereby allowing the carriage to trace the motion of the lens actuator 60 and controlling so as to set the optical axial deviation amount (relative value) to zero. Therefore, at the start of the tracking servo in which the servo switch 143 is turned on, when the optical axial deviation amount of the objective lens is equal to a value near zero, the optical axial deviation amount can be maintained to a value near zero during the on-track operation. For example, the carriage driving operation which traces a change in track position by the eccentricity of the optical disk can be performed. The equalizing filter 144 receives the drive current I$a$ of the lens actuator 60 which is outputted from the gain setting device 140 of the tracking servo unit 130 and outputs a pseudo predictive lens position signal indicative of the optical axial deviation amount of the objective lens based on the prediction of the motion of the lens actuator 60 in accordance with a predetermined predictive operational equation. An arithmetic operation of the predictive optical axial deviation amount by the equalizing filter 144 is obtained by the following equation. To construct the equalizing filter 144, a modeling process of the lens actuator 60 is first executed. An equation of motion for the actuator having characteristics of a spring constant K [N/m], an attenuation constant c [Ns/m], a mass of a movable portion m [Kg], and an acceleration performance BL [N/A].

$$m(d^2x/dt^2) = kx + c(dx/dt) + (BL)i$$

where, x(t): displacement of the objective lens i(t): actuator coil current

By Laplace transforming the above equation, the following voltage function of the displacement of the objective lens for the coil current of the lens actuator 60 is obtained.

$$X(s) = [\{(BL)/m\}/\{s^2 + (c/m)s + (k/m)\}] \cdot I(s)$$
$$= [\{(BL)/m\}/(s^2 + 2\zeta\omega_n s + \omega_n^2)] \cdot I(s)$$

where, $\zeta$: viscosity coefficient $\omega_n$: primary resonance angular frequency [rad/s]

The above equation has a form of a secondary low pass filter and the equalizing filter 144 is constructed so that an input is a coil current i of the lens actuator 60 and an output is a displacement x of the objective lens. Since the equalizing filter 144 is fundamentally a secondary low pass filter, an IIR filter (Infinite Impulse Response Filter) at an own device of the DSP 15 can be applied. However, a cut-off frequency of the lens actuator 60 is set to a relatively low frequency such as tens of Hz. In such a case, it is difficult from experiences to combine a precise IIR filter. Therefore, the equalizing filter 144 is realized by the DSP 15 by solving the equation of motion by a state space method. First, as state variables, a displacement x of the objective lens and its differentiated value, namely, a velocity x2 are selected and the following state equation is formed. That is, by assuming such that x1=x(t) and x2=dx/dt (=v(t)), the following equation is derived.

$$\frac{d}{dt}\begin{bmatrix} x1 \\ x2 \end{bmatrix} = \begin{bmatrix} 0 & 1 \\ -\omega_n^2 & -2\zeta\omega_n \end{bmatrix} \begin{bmatrix} x1 \\ x2 \end{bmatrix} + i \begin{bmatrix} 0 \\ (BL)/m \end{bmatrix}$$

By dispersing it by a sampling time Ts, the following state transition equation is obtained.

$$\begin{bmatrix} x1' \\ x2' \end{bmatrix} = \begin{bmatrix} 1 & Ts \\ -\omega_n^2 T_s & -2\zeta\omega_n T_s \end{bmatrix} \begin{bmatrix} x1 \\ x2 \end{bmatrix} + \begin{bmatrix} 0 \\ T_s(BL)/m \end{bmatrix}$$

where, the items of Ts$^2$ or more are approximate to zero.

The contents which are expressed by the above equation are "when i is inputted to a system having state amounts x1 and x2 at a certain time, to which amounts the state amounts change at the next sampling time?". Firmware of the DSP 15 calculates the state amounts at every sampling time, namely, the displacement x1 and velocity x2 of the objective lens on the basis of the state transition equation and predicts them. According to the on-track control by an equalizing filter method in a form of solving the state equation as mentioned above, since a VCM error signal and its differentiation value are obtained, a phase advance compensation of the following equation can be performed by a proportional differentiation control (PD control).

$$y = [Kp\ Kd] \begin{bmatrix} x1 \\ x2 \end{bmatrix}$$

where, y: VCM control signal

Kp: proportional control gain

Kd: differentiation control gain

That is, an output of the equalizing filter 144 functions as a pseudo lens position signal predicted from the coil current of the lens actuator 60. By adding such a signal to a phase compensating unit 145 and the gain setting unit 146, the VCM 64 is driven, thereby applying a double servo for lens lock to allow the carriage to trace the motion of the lens actuator 60. However, the apparatus has a mechanism such that in case of controlling by the double servo of the VCM 64 by the equalizing filter method, the lens actuator 60 and the carriage which is driven by the VCM 64 act on each other. That is, according to the spring supporting mechanism of the lens actuator 60 as shown in FIG. 6, the relative positional relation between the VCM side and the lens side appears as a force which acts on the servo system. Therefore, a loop of the lens actuator 60 and a loop of the VCM 64 are not independent and the output of the equalizing filter 144 is not reasonable. To solve it, it is necessary to previously cancel an interaction that is mechanically predicted. That is, the calculation itself of the double servo is performed on the assumption that the mechanism portion is independent and the reaction force compensating filter 148 to correct a calculation result is provided. The reaction force compensating filter 148 corrects the calculated lens actuator current I$a$ by the following equation.

$$Ia = Ia + [\{(BL)v/mv\}/\{(BL)a/ma\}] \cdot Iv$$

where, (BL)v: acceleration performance of the VCM
(BL)a: acceleration performance of the lens actuator
mv: mass of the VCM carriage movable portion
ma: mass of the lens actuator When the seek error processing unit 10-4 of the MPU 14 receives the signal indicative of the detection of the arrival at the target track by the low speed seek control unit 10-1 and turns on the servo switch 143 of the tracking servo unit 130, the seek error processing unit 10-4 detects the presence or absence of a seek error on the basis of the tracking error detection signal E1. The seek error is detected when the tracking error detection signal exceeds a predetermined level or when a zero-crossing frequency of the tracking error detection signal exceeds a predetermined frequency. When the seek error is detected, the seek error processing unit 10-4 turns on the servo switch 112 of the low speed lens lock control unit 15-1 for a predetermined time, for instance, 25 msec and drives the VCM 64 so as to set the pseudo lens position signal E3 according to the offset of the tracking error detection signal E1 obtained by the offset operating unit 108 at that time to zero. Therefore, by driving the VCM 64 by the low speed lens lock control, the carriage is allowed to trace the abnormal motion of the lens actuator 60. After completion of the low speed lens lock control for the predetermined time, the optical axial deviation amount is suppressed to a value near zero. By turning on the servo switch 143 again at this time point, the light beam is pulled in to an arbitrary nearest track at that time point by the tracking servo unit 130, so that the control mode can be shifted to the on-track control. Therefore, the ID portion is read with respect to the track in which the pull-in is successful, a track address in which the light beam is located at present is recognized, and a retry seek to the target track is carried out. Such a lens lock control upon detection of the seek error can be also performed by using the high speed lens lock control unit 15-2. That is, when the seek error is detected, the seek error processing unit 10-4 turns on the servo switch 100 of the high speed lens lock control unit 15-2 for a predetermined time, for instance, 25 msec, thereby driving the lens actuator 60 so as to set the pseudo lens position signal E4 according to the offset of the tracking error detection signal E1 from the low pass filter 94 to zero at that time. Therefore, the lens actuator 60 is subjected by the driving by the high speed lens lock control and the optical axial deviation is suppressed to a value near zero at a time point when the high speed lens lock control for a predetermined time is finished. When the servo switch 143 is again turned on, the light beam is pulled in to an arbitrary nearest track at that time point by the tracking servo unit 130 and the control mode can be shifted to the on-track control. The ID portion is read with respect to the track in which the pull-in is successful, the track address in which the light beam is located at present is recognized, and a retry seek to the target track is carried out.

Figure 14:
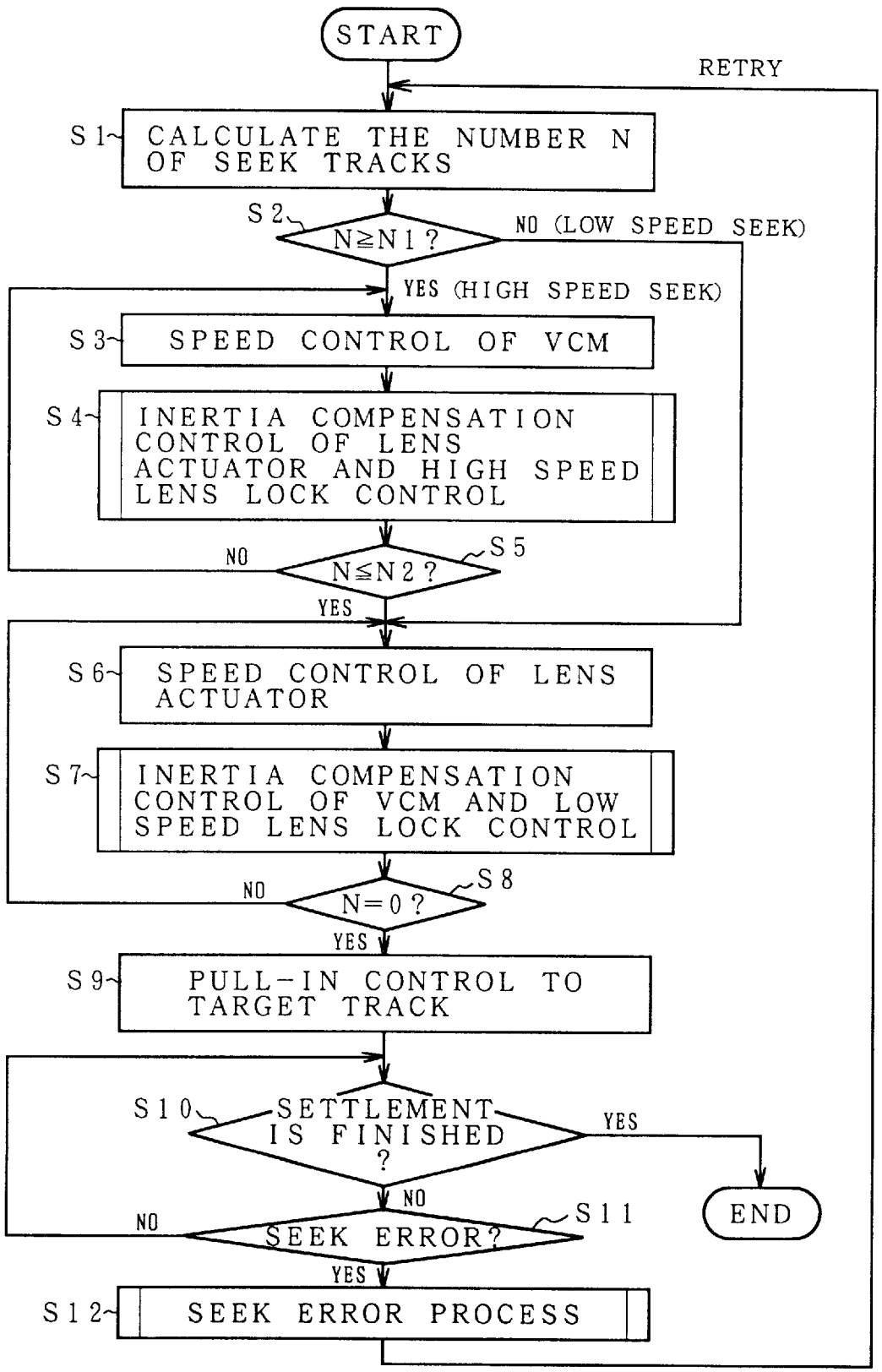
FIG. 14 is a flowchart for a seek control in FIGS. 9A and 9B.

FIG. 14 is a flowchart for a seek control in the first embodiment of FIGS. 9A and 9B. First in step S1, when a seek command is received from an upper apparatus, the number N of seek tracks to the target track is calculated from a difference between the target track number and the present track number. In step S2, the number N of seek tracks is compared with a predetermined specified value N1. When N is larger than the specified value, the control mode is shifted to the high speed seek control by the speed control of the VCM in step S3. In the high speed seek control, the speed of the VCM 64 is controlled on the basis of the velocity deviation between the target velocity and the measured velocity in step S3. At the same time, in step S4, the inertia compensation control for the lens actuator 60 and the lens lock control by the low speed lens lock control unit 15-1 are performed. In step S5, a check is made to see if the number N of seek tracks has reached a predetermined value N2 during the high speed seek. When N reaches the predetermined number N2 of tracks, the control mode is switched to the low speed seek control by the speed control of the lens actuator 60 in step S6. During the low speed seek control, the inertia compensation control of the VCM 64 and the lens lock control by the second lens lock control unit 15-2 are simultaneously performed in step S7. When the number N of seek tracks is equal to zero and the light beam reaches the target track during the low speed seek control, step S9 follows. The control mode is switched to the position servo of the tracking servo unit 130 based on the tracking error signal and the beam pull-in control to the target track is executed. After completion of the beam pull-in control, a settlement in which the tracking error signal lies within a specified range around 0 as a center is discriminated in step S10. As processes after completion of the seek control, the reading/writing operation is set into a ready mode by the completion of the seek and the data is written or read out to/from the target track. When the number N of seek tracks to the target track is less than the specified value N1 in step S2, step S6 follows and the low speed seek control is executed. The low speed seek control in this case is substantially the same as the low speed seek control that is performed when N reaches the specified value N2 during the high speed seek control. On the other hand, during the discrimination about the completion of the settlement in step S10, the seek error is detected in step S11. When the tracking error signal exceeds a predetermined level or when the frequency of the track zero-crossing signal exceeds a predetermined frequency, the occurrence of the seek error is determined. A seek error process in step S12 follows. In the seek error process in step S12, the low speed lens lock control unit 15-1 or high speed lens lock control unit 15-2 is turned on and is controlled so as to set the optical axial deviation amount of the objective lens to zero. After that, the processing routine is returned to step S1 and a retry seek is performed.

Figure 15B:
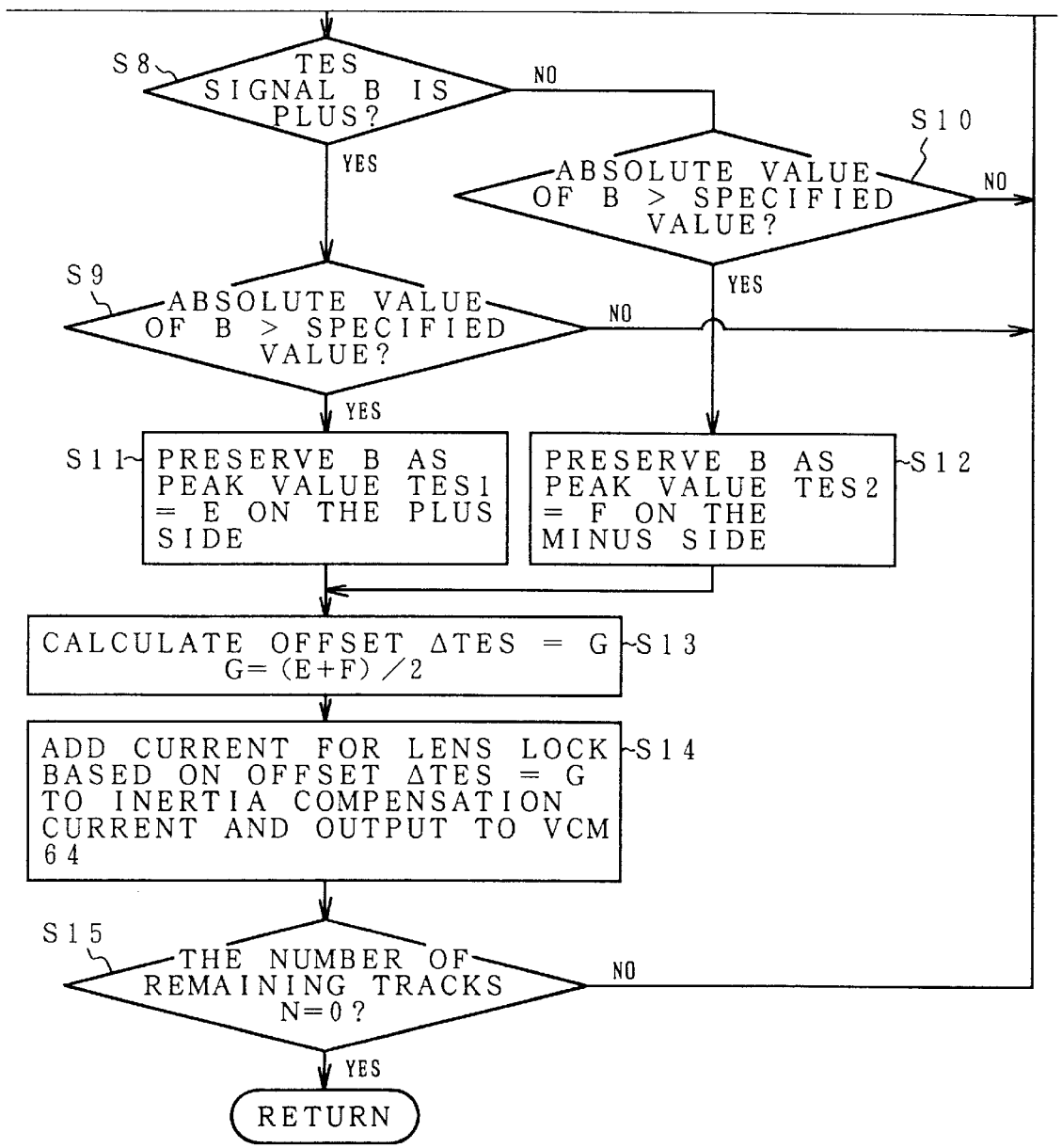

FIGS. 15A and 15B are flowcharts for the inertia compensation control to the VCM 64 and the lens lock control by the low speed lens lock control unit 15-1 during the low speed seek which are executed in step S7 in FIG. 14. The processes in the flowcharts are repeated every sampling clock to decide an operation period of the DSP 15 in FIGS. 9A and 9B. First in step S1, a tracking error signal A obtained in the present sample is read. In step S2, a change amount C at one sampling period is calculated as C=B−A. In step S4, the tracking error signal A of the present sample for the next process is substituted into a tracking error signal B of one sample before. In step S5, a check is made to see whether the absolute value of the change amount C calculated in step S3 is equal to or less than a specified value or not. When it is equal to or less than the specified value, the processing routine is returned to step S1 and the processes at the next sampling timing are executed. The absolute value of the change amount c is equal to or less than the specified value when a beam speed is low. Since the operation timing is now at a stage of the start of the acceleration or the stop of the deceleration and the frequency is relatively low, it is excluded. When the absolute value of the change amount C exceeds the specified value in step S5, the processing routine advances to step S6. The change amount C of one sample before is loaded and is set to a change amount D. In step S7, a check is made to see if a polarity of the change amount C of the present sample has changed from a polarity of the change amount D of one sample before by discriminating whether the tracking error signal has passed through the peak point or not. In step S7, when the polarity of the change amount C of the present sample changes from the polarity of the change amount D of one sample before, since this means that the tracking error signal has passed through the peak point, the processing routine advances to step S8. A check is made to see if the tracking error signal B in the present sample substituted as a tracking error signal B of one sample before in step S4 is plus. If YES, step S9 follows and a check is made to see if the absolute value of the tracking error signal B is larger than a specified value. If YES, the tracking error signal B is preserved as a peak value TES1=E on the + side in step S11. When the tracking error signal B is minus in step S8, step S10 follows and a check is made to see if the absolute value of the tracking error signal B is larger than a specified value in a manner similar to step S9. If YES, the tracking error signal B is preserved as a peak value TES2=F on the − side in step S12. In step S13, an offset ΔTES=G is calculated as $$G=(E+F)/2$$

For example, when the peak value TES1=E on the plus side is derived in step S11 regarding the present sample, since the peak value TES2=F on the minus side has already been derived in step S12 at a timing of one sample before, the offset ΔTES=G can be calculated as G=(E+F)/2. The offset ΔTES=G calculated in step S13 is set to the lens position signal E3 at that time. Therefore, in step S14, the current for lens lock based on the calculated offset ΔTES=G is added to the current for inertia compensation, the resultant current is outputted to the VCM 64 serving as a carriage actuator, and the present optical axial deviation is set to zero. Such processes in steps S1 to S14 as mentioned above are repeated every sample of the DSP 15. When the number N of remaining tracks is equal to zero and the light beam reaches the target track in step S15, the processing routine is returned to the main routine in FIG. 14. Step S15 in FIG. 15B is the same as step S8 in FIG. 14. Therefore, the processing routine in FIGS. 15A and 15B is returned to the pull-in control to the target track in step S9 in FIG. 14.

FIGS. 16A to 16G are time charts in the low speed seek control in the first embodiment of FIGS. 9A and 9B. In the low speed seek control, as shown at a beam speed in FIG. 16A, after the acceleration control was performed by the activation at time t1, when the speed reaches a predetermined target speed at time t2, the constant speed control is executed. The deceleration control is performed at time t3 that is a predetermined number of tracks before the target track. The track pull-in control is executed at time t4 when the light beam reaches the target track. In response to the change in beam speed in FIG. 16A as mentioned above, the tracking error signal changes as shown in FIG. 16B. The tracking error signal E1 is held at a predetermined frequency during the constant speed control for a time interval from time t2 to time t3. For this constant speed period of time, the stable pseudo lens position signal E3 can be obtained. Therefore, the lens locking mode in which the lens lock control in FIG. 16F is turned on or off is turned on after the elapse of a delay time Td until the control mode enters the constant speed control at time t2 from the activation of the seeking operation at time t1. The lens lock control is performed to the VCM by the pseudo lens position signal which is obtained on the basis of the tracking error signal E1.

The current Ia which is supplied to the lens actuator 60 to obtain the profile of the beam speed in FIG. 16A is as shown in FIG. 16C. When considering, for example, the outer seek, the current Ia which is supplied to the lens actuator 60 has a smooth current profile such that after it increased to the plus side step by step for the acceleration period of time of t1 to t2, when the control mode approaches the constant speed control, the current Ia decreases similarly step by step. By likewise increasing and decreasing the deceleration current step by step from time t3, the smooth deceleration is executed. The current Iv which is supplied to the VCM 64 for inertia compensation simultaneously with the current Ia of the lens actuator 60 is as shown in FIG. 16D. The VCM current Iv is a current in which the inertia compensation coefficient α1 that is given by the equation (1) is multiplied to the lens actuator current Ia as shown in FIG. 12. Thus, the carriage is also accelerated or decelerated by the activation of the VCM 64 in response to the acceleration or deceleration of the lens actuator 60 in the low speed seeking mode. Therefore, even if the lens position signal is not obtained upon acceleration or deceleration, since there is no relative displacement between the lens actuator and the carriage, the occurrence of the optical axial deviation of the objective lens is certainly prevented. Since the pseudo lens position signal is derived from the tracking error signal E1 for the constant speed period of time of t2 to t3, the lens lock control is performed, so that the lens lock to always maintain the optical axial deviation of the objective lens to zero can be certainly performed. In such a low speed seek control, the seeking mode as shown in FIG. 16E is turned on at the start of the seek at time t1 and is turned off by the pull-in control by the arrival at the target track at time t4. Further, with respect to the on-track control, as shown in FIG. 16G, it is turned off at the start of the seek at time t1 and is turned on by the pull-in control by the arrival at the target track of the seek at time t4.

FIGS. 17A to 17E are time charts for the high speed seek control in the first embodiment of FIGS. 9A and 9B. In the high speed seek control, the beam speed is accelerated by the driving of the VCM at time t1 as shown in FIG. 17A. After the beam speed reaches the specified high constant speed at time t2, the deceleration control of the VCM is performed at time t3 when the number of tracks to the target tracks reaches the specified track number serving as a switching reference of the low speed seek control. The control mode is switched to the low speed seek control at time t4. That is, as shown in the control mode of FIG. 17E, the high speed seeking mode is performed for a time interval from t1 to t4 and the low speed seeking mode is executed after that. The low speed seeking mode from time t4 is substantially the same as the constant speed seek control in FIGS. 16A to 16G except that the control mode immediately enters the constant speed control without needing the acceleration period. The deceleration of the low speed seek control is carried out at time t3 that is a predetermined number of tracks before the target track. When the light beam reaches the target track at time t7, the pull-in control is executed. The settlement is completed at time t8. For the beam speed in the high speed seeking mode in FIG. 17A, the tracking error signal E1 is as shown in FIG. 17B. That is, although a tracking error signal E1 has a high frequency of tens of kHz during the high speed seek, when the control mode is switched to the low speed seek control during the operation, the frequency changes to a low frequency of 10 kHz or less. The speed control is executed during the high speed seek for a time interval from time t1 to time t4 by supplying the current Iv to the VCM as shown in FIG. 17D. By increasing the VCM current Iv step by step for the acceleration period of time of t1 to t2, the carriage is smoothly accelerated. Similarly, by increasing and decreasing the current step by step in the (−) direction for the deceleration period of time from t3 to t4, the carriage is smoothly decelerated. At the same time, the lens actuator current I$a$ in FIG. 17C is a current in which the inertia compensation coefficient α2 in the equation (3) shown in FIG. 13 is multiplied to the VCM current I$v$. By also supplying the inertia compensation current I$a$ to the lens actuator 60 simultaneously with the acceleration of the carriage by the VCM 64, the lens actuator is driven so as to overcome the inertia force in association with the activation of the carriage, thereby performing the lens lock to hold the objective lens to a position where the optical axial deviation is equal to zero. The same shall also apply to the case of deceleration of the VCM for an interval from t3 to t4. By supplying the inertia compensation current I$a$ to the lens actuator 60, the optical axial deviation of the objective lens is held to zero so that the lens actuator 60 installed doesn't overrun due to the inertia for the deceleration of the carriage. Since the frequency of the tracking error signal E1 is almost constant to be, for example, tens of kHz during the constant speed control for an interval from time t2 to time t3, the stable lens position signal E4 is obtained. The lens lock by the position control of the lens actuator 60 is certainly performed so as to set the lens position signal E4 to zero. The control in the low speed seeking mode after time t4 is similar to the low speed seek control after time t2 in FIGS. 16A to 16G.

Figure 18:
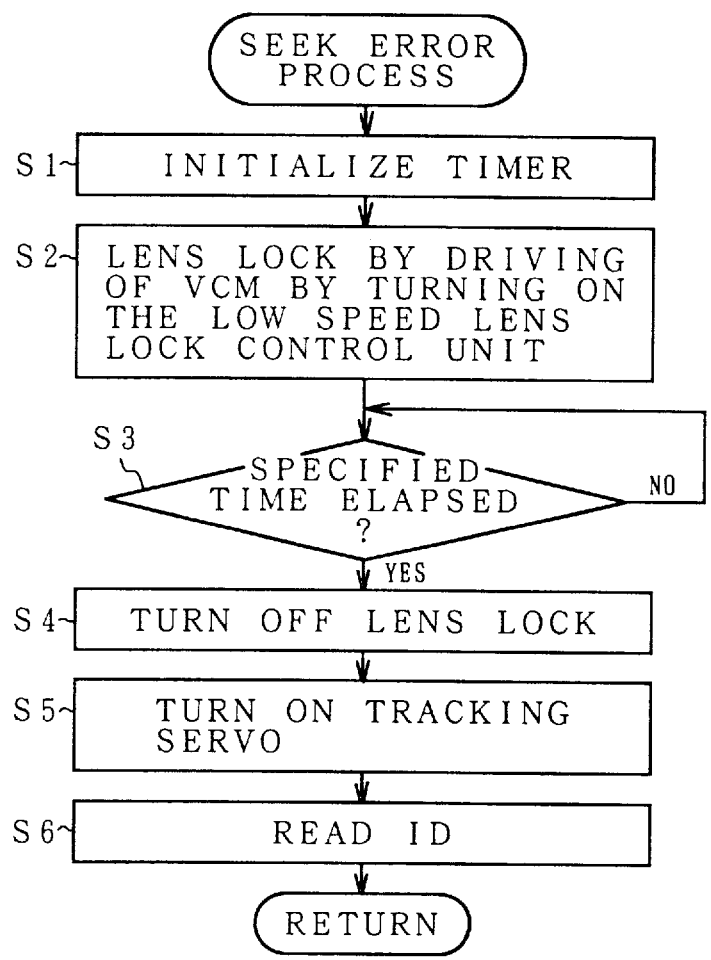
FIG. 18 is a flowchart for a seek error process according to the invention.
Figure 19A:
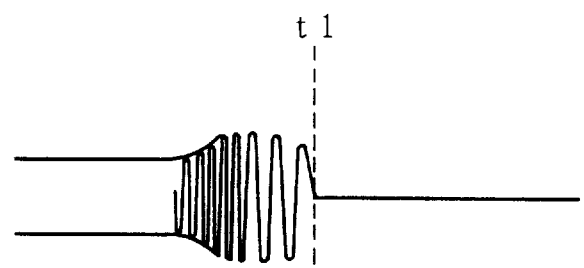
FIGS. 19A to 19D are time charts when a track pull-in is normally performed.
Figure 19B:
Figure 19C:
Figure 19D:

FIG. 18 is a flowchart for the seek error process according to the invention in step S12 in FIG. 14. When the seek error is detected, first in step S1, a timer is initialized. In step S2, the lens lock is performed by the driving of the VCM 64 by the turn-on of the low speed lens lock control unit 15-1 and the timer is activated at this time. In step S3, the elapse of a specified time, for example, 25 msec by the timer is discriminated. When the specified time elapses, step S4 follows and the control of the low speed lens lock control unit 15-1 is turned off. In step S5, the tracking servo unit 130 is turned on and the track pull-in is again executed. When the track pull-in is successful, the ID portion is read in step S6 and the processing routine is returned to step S1 in FIG. 14. The retry seek is performed.

Figure 20A:
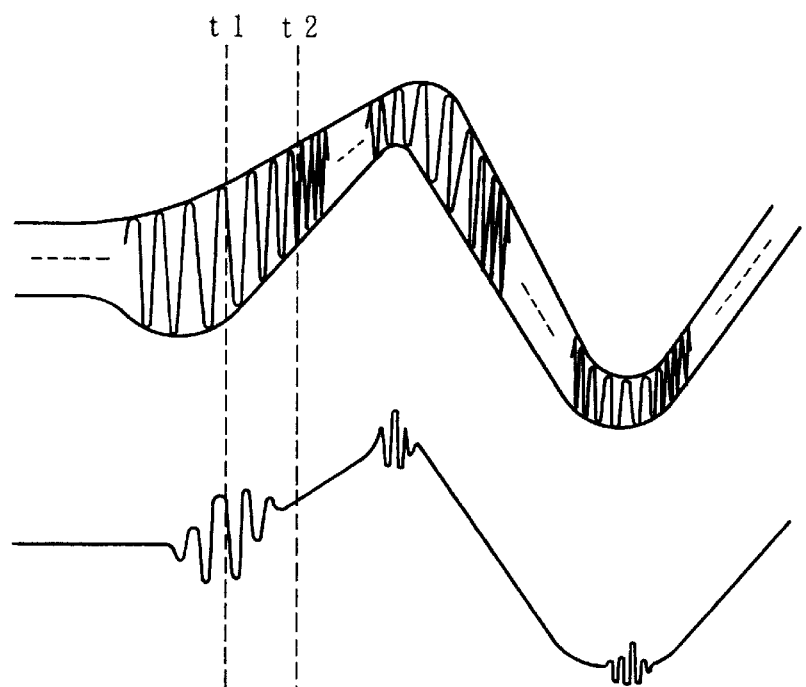
Figure 20B:
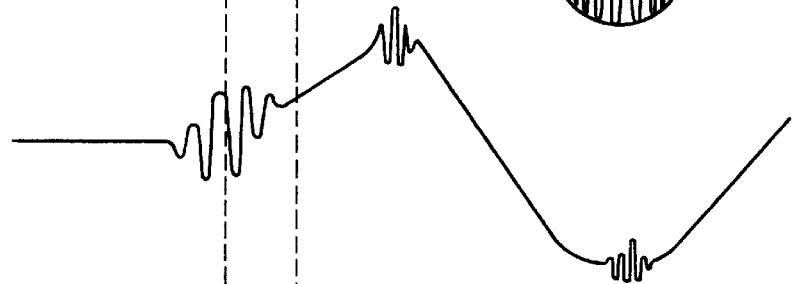
Figure 20C:
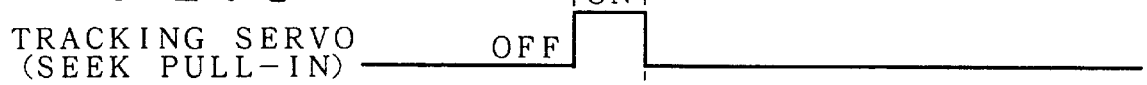
Figure 20D:
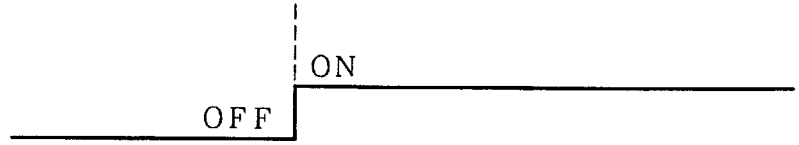

FIGS. 19A to 19D are time charts for the tracking error signal, output of the low pass filter 94, control of the tracking servo unit 130, and seek error in the case where the seeking operation is normally completed. On the other hand, FIGS. 20A to 20D are time charts when the seek error occurs. That is, the tracking error signal in FIG. 20A is subjected to a vibration or the like from the outside at the time of track pull-in at time t1 and starts to largely offset. Therefore, the tracking error signal exceeds a predetermined level at time t2 and the seek error in FIG. 20D is turned on. At this time, the tracking servo in FIG. 20C which was turned on by the track pull-in at time t1 is turned off. Thus, the apparatus enters a non-control state after time t2 when the tracking error is detected. The tracking actuator largely runs away as will be obviously understood from the tracking error signal in FIG. 20A and the apparatus enters an uncontrollable state.

Figure 21A:
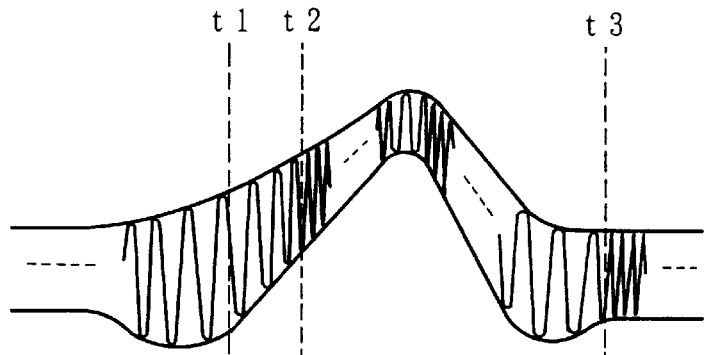
Figure 21B:
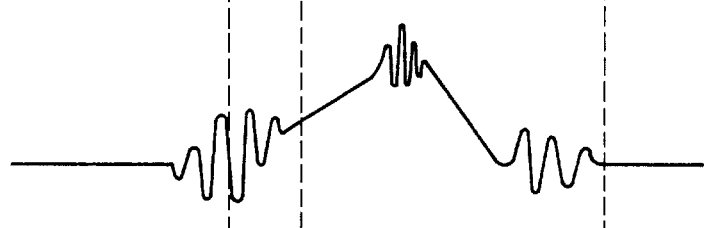
Figure 21C:
Figure 21D:
Figure 21E:
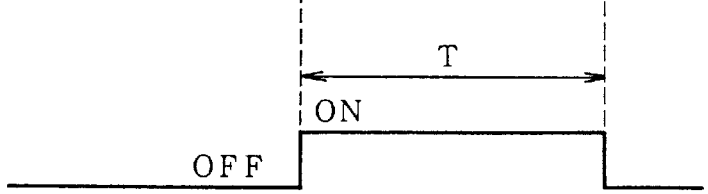

FIGS. 21A to 21E are time charts for the seek error process of the invention according to the flowchart of FIG. 18. When the seek error is detected at time t2, the lens lock control is turned on for a predetermined time T until time t3 as shown in FIG. 21E. Therefore, the lens lock control to set the output of the low pass filter in FIG. 20B depending on the offset of the tracking error signal in FIG. 21A, namely, the pseudo lens position signal to zero is executed. At a time point of time t3 when the lens lock control is turned off, accordingly, the control is stabilized to a state in which the optical axial deviation amount which hardly has the offset of the tracking error signal in FIG. 21A is close to zero. When the track pull-in is again performed by turning on the tracking servo again, consequently, the light beam is pulled in to the nearest track and the on-track control is performed. The ID portion of the track is read and the control mode can be shifted to the retry seek.

Figure 22:
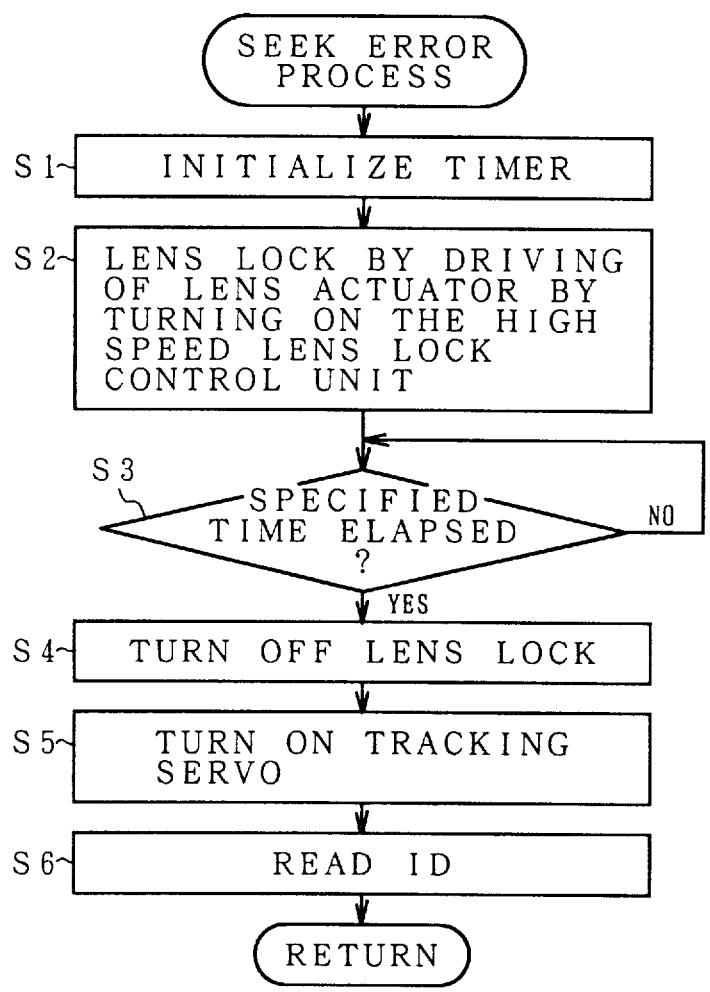
FIG. 22 is a flowchart of another embodiment for a seek error process according to the invention.

FIG. 22 is a flowchart for another embodiment of the seek error process of the invention in step S12 in FIG. 14 and is characterized in that the high speed lens lock control is turned on. When the seek error is detected, first in step S1, the timer is initialized. In step S2, the lens lock is performed by the driving of the lens actuator 60 by the turn-on of the high speed lens lock control unit 15-2. In this instance, the timer is activated. In step S3, a check is made to see if a specified time, for instance, 25 msec by a timer has elapsed. When the specified time elapses, step S4 follows and the control of the high speed lens lock control unit 15-2 is turned off. In step S5, the tracking servo unit 130 is turned on and the track pull-in is again executed. When the track pull-in is successful, the ID portion is read in step S6. The processing routine is returned to step S1 in FIG. 14 and the retry seek is executed.

Figure 23A:
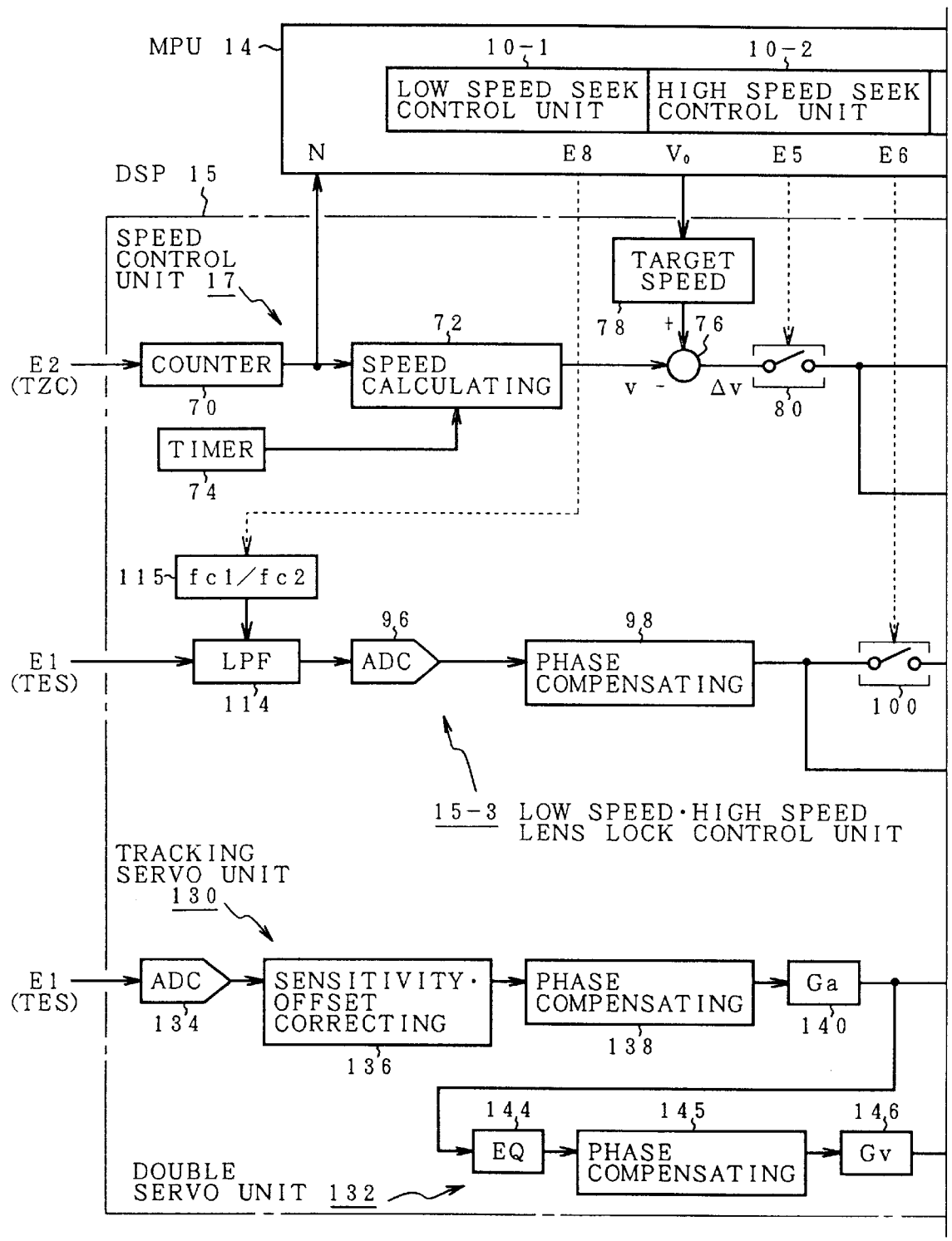
FIGS. 23A and 23B show block diagrams of the second embodiment of the seek control units in FIG. 8.
Figure 23B:
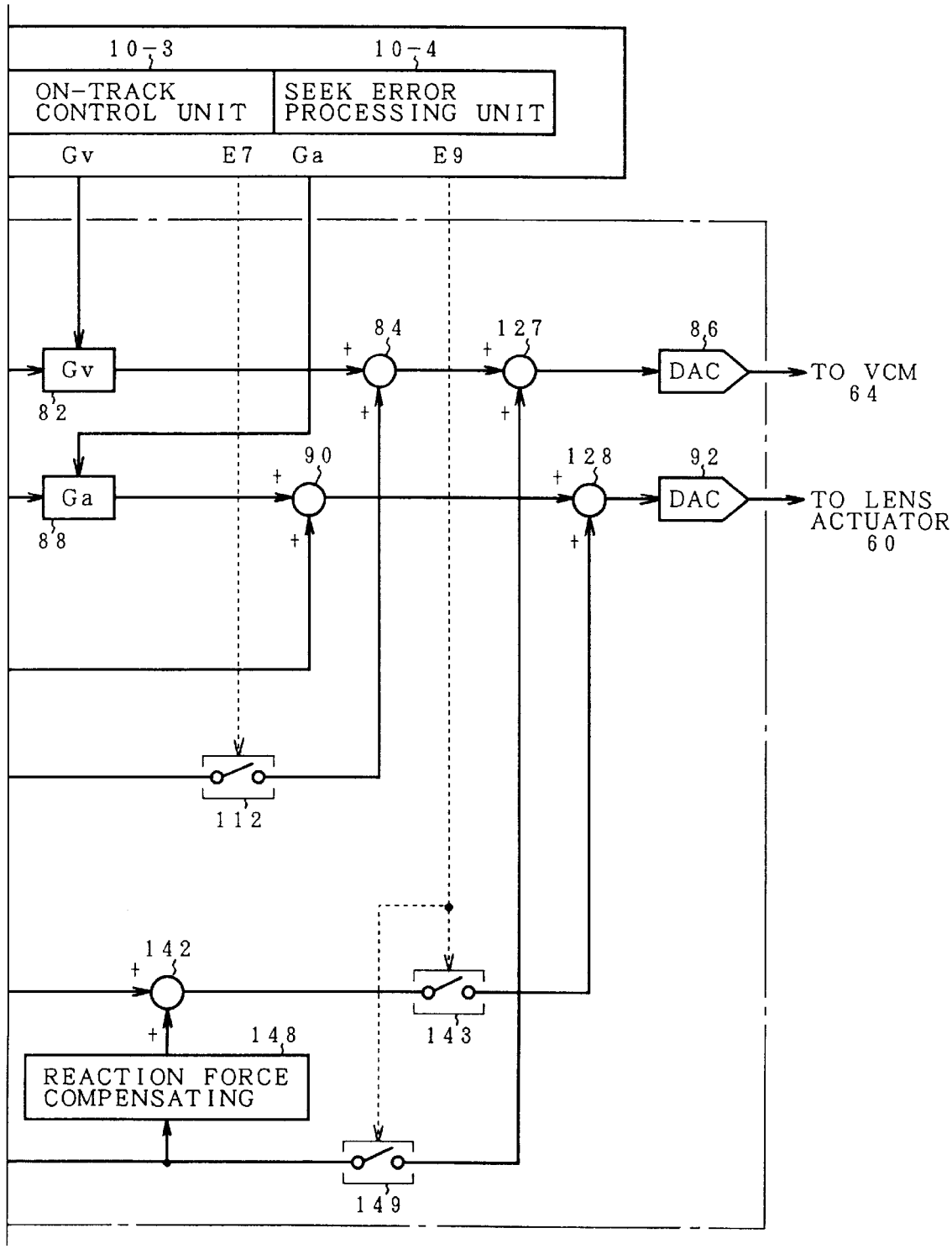

FIGS. 23A and 23B relate to the second embodiment of a seek control unit of the invention. The second embodiment is characterized in that a low pass filter to detect the lens position signal in the low speed seeking mode and that in the high speed seeking mode are commonly constructed and a cut-off frequency of the low pass filter is switched in the low speed seeking mode and the high speed seeking mode. In the embodiment, the low speed lens lock control unit 15-1 and high speed lens lock control unit 15-2 in FIGS. 9A and 9B are replaced with a common low speed/high speed lens lock control unit 15-3. A low pass filter 114 whose cut-off frequency can be switched by a control signal E8 from the MPU 14 is provided for the low speed/high speed lens lock control unit 15-3. A filter characteristics switching unit 115 to switch the cut-off frequency to a cut-off frequency fc1 on the low frequency side and a cut-off frequency fc2 on the high frequency side is provided for the low pass filter 114.

Figure 24:
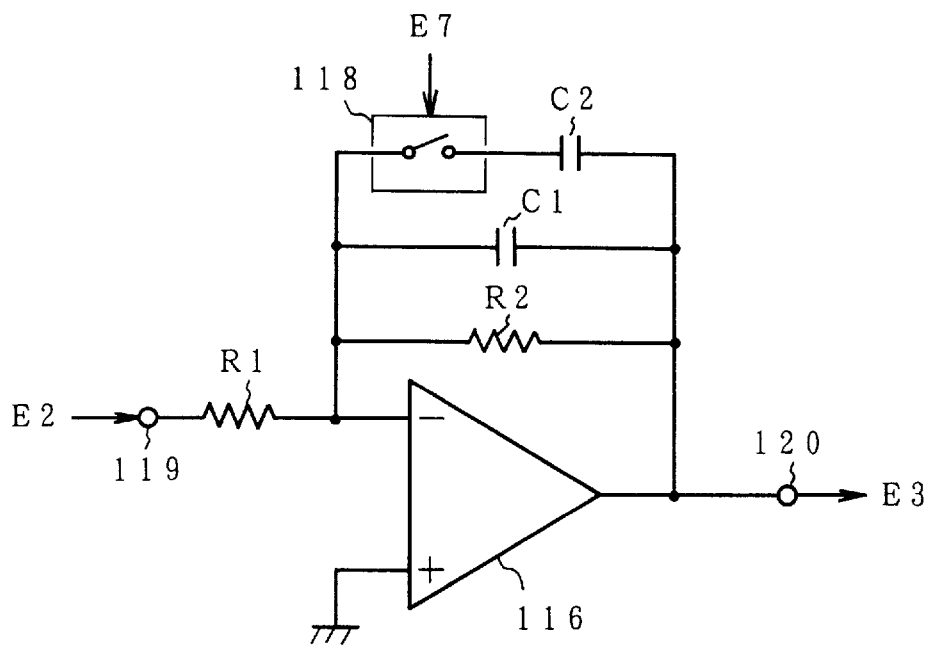
FIG. 24 is a circuit diagram of a filter characteristics switching circuit and a low pass filter in FIGS. 23A and 23B.
Figure 25:
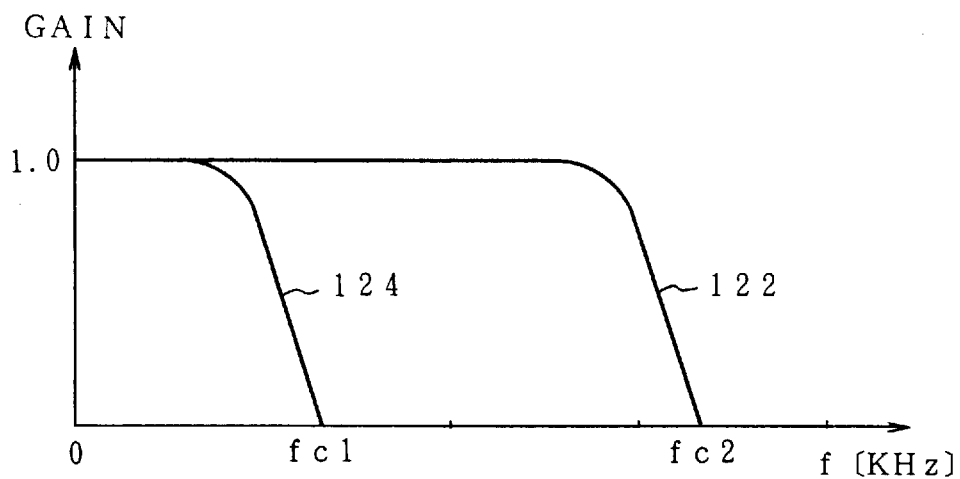
FIG. 25 is an explanatory diagram of low pass filter characteristics in the low speed seeking mode and high speed seeking mode in FIG. 24.

FIG. 24 shows a circuit construction of the low pass filter 114 and filter characteristics switching unit 115 in FIGS. 23A and 23B and it is realized as an analog-like active filter. A minus (−) input terminal 117 of an operational amplifier 116 is connected through a resistor R1 to the active filter functioning as a low pass filter. An output of the operational amplifier 116 is feedback connected to the (−) input terminal through a resistor R2. A capacitor C1 is connected to the feedback resistor R2 in parallel. A serial circuit of a capacitor C2 and an analog switch 118 is further connected to the feedback resistor R2 in parallel. The capacitors C1 and C2 provided in the feedback circuit determine a cut-off frequency of the low pass filter. FIG. 25 shows frequency characteristics of the low pass filter in FIG. 24. When the analog switch 118 is turned off as shown in the diagram, filter characteristics 122 are obtained. When the analog switch 118 is turned on, filter characteristics 124 are obtained. That is, in the low speed seeking mode, the analog switch 118 is turned on and the capacitors C1 and C2 are connected in parallel to the feedback circuit. Thus, a capacitance in this instance is equal to C1+C2 and the cut-off frequency fc1 is located on the low frequency side as shown in the filter characteristics 124. On the other hand, in the high speed seeking mode, the analog switch 118 is turned off as shown in the diagram and the capacitor C2 is disconnected, so that the cut-off frequency is determined by only the capacitor C1. Since a capacitance in this instance is smaller than the capacitance (C1+C2) in the low speed seeking mode, the cut-off frequency is set to fc2 on the high frequency side as shown in the filter characteristics 122 in FIG. 25.

Referring again to FIGS. 23A and 23B, the output of the LPF 114 whose cut-off frequency can be switched is subjected to an advance phase compensation with respect to the high frequency component by the phase compensating unit 98. After that, the phase compensated output is supplied to the adder 90 or 84 through the servo switch 100 or 112. In the low speed seeking mode, the servo switch 112 is turned on and the servo switch 100 is turned off. The filter characteristics switching circuit 115 switches the LPF 114 to the cut-off frequency fc1 on the low frequency side. Thus, the pseudo lens position signal is detected from the tracking error signal derived by the low speed seek and is added to the adder on the VCM 64 side through the servo switch 112, thereby performing the lens lock by the driving of the VCM for the speed control by the lens actuator 60. In the high speed seeking mode, on the contrary, the servo switch 100 is turned on and the servo switch 112 is turned off. In this instance, the filter characteristics switching circuit 115 has been switched to the cut-off frequency fc2 on the high frequency side. The lens position signal is detected by the characteristics of the LPF 114 adapted to the tracking error signal of the high frequency derived by the high speed seek. The lens position signal is added to the lens actuator 60 side through the servo switch 100, thereby performing the lens lock. Now assuming that, for example, the frequency of the tracking error signal is set to 10 kHz in the low speed mode and to 50 kHz in the high speed mode, cut-off frequencies fc1 and fc2 on the low frequency side and high frequency side of the LPF 114 are set to 2.0 kHz and 10 kHz corresponding to ⅕ of those frequencies, respectively. The cut-off frequencies fc1 and fc2 can be also set to 1.0 kHz and 5 kHz corresponding to ¹⁄₁₀ of them, respectively. It is sufficient to determine the optimum cut-off frequencies at which the stable lens position signal is derived.

The on-track control unit 10-3 and seek error processing unit 10-4 provided in the MPU 14 in FIGS. 23A and 23B and the tracking servo unit 130 and double servo unit 132 provided in the DSP 15 are fundamentally the same as those in the embodiment of FIGS. 9A and 9B. In case of turning on the low speed lens lock control and controlling the lens optical axial deviation amount to zero when the seek error is detected, the seek error processing unit 10-4 allows the filter characteristics switching unit 115 to switch the cut-off frequency of the LPF 114 to the cut-off frequency fc1 on the low frequency side and turns on the servo switch 112, thereby performing the lens lock by the driving of the VCM 64. In case of turning on the high speed lens lock control and controlling the lens optical axial deviation amount to zero when the seek error is detected, the seek error processing unit 10-4 allows the filter characteristics switching unit 115 to switch the cut-off frequency of the LPF 114 to the cut-off frequency fc2 on the high frequency side and turns on the servo switch 100, thereby performing the lens lock by the driving of the lens actuator 60.

Figure 26A:
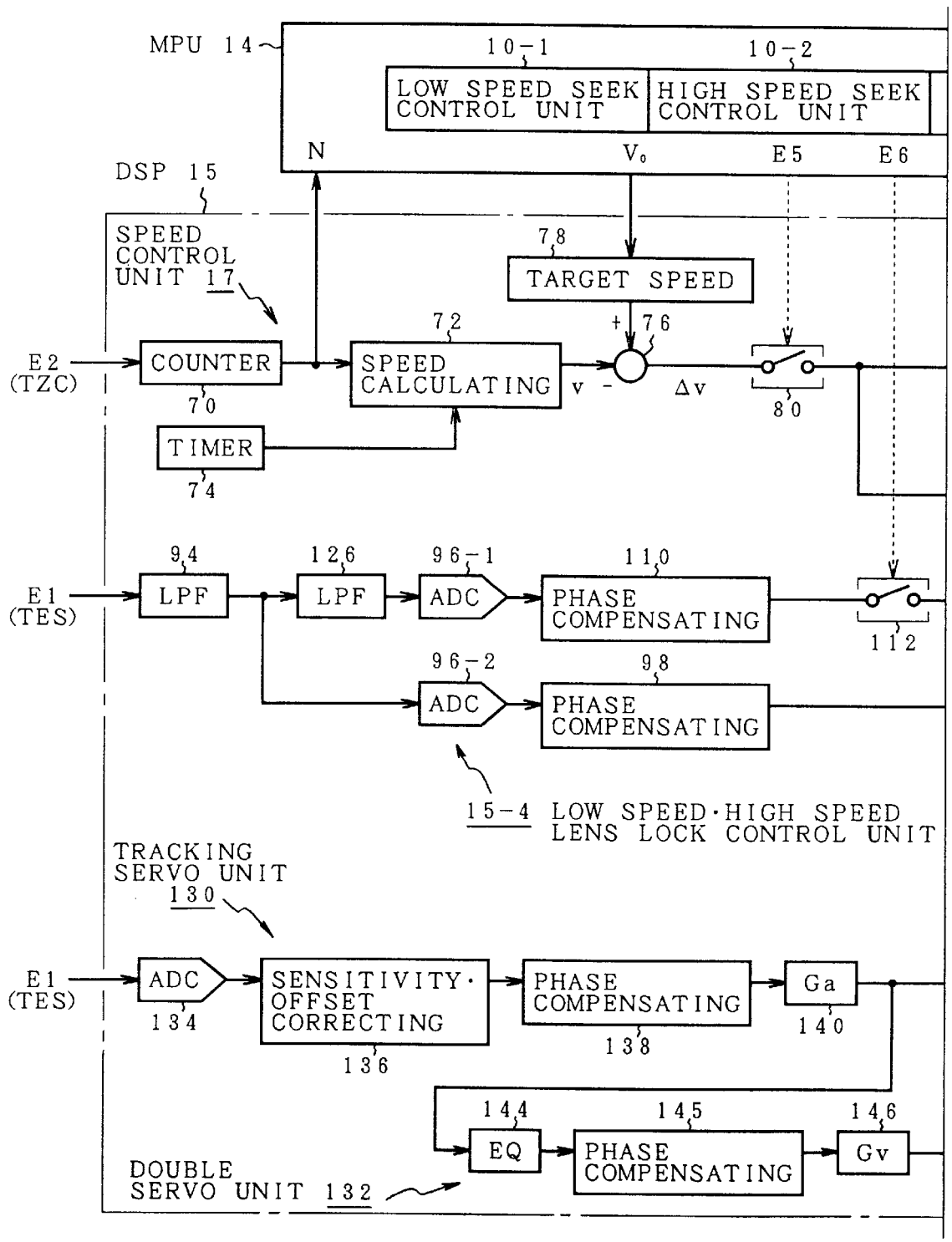
FIGS. 26A and 26B are block diagrams of the third embodiment of the seek control unit in FIG. 8.
Figure 26B:
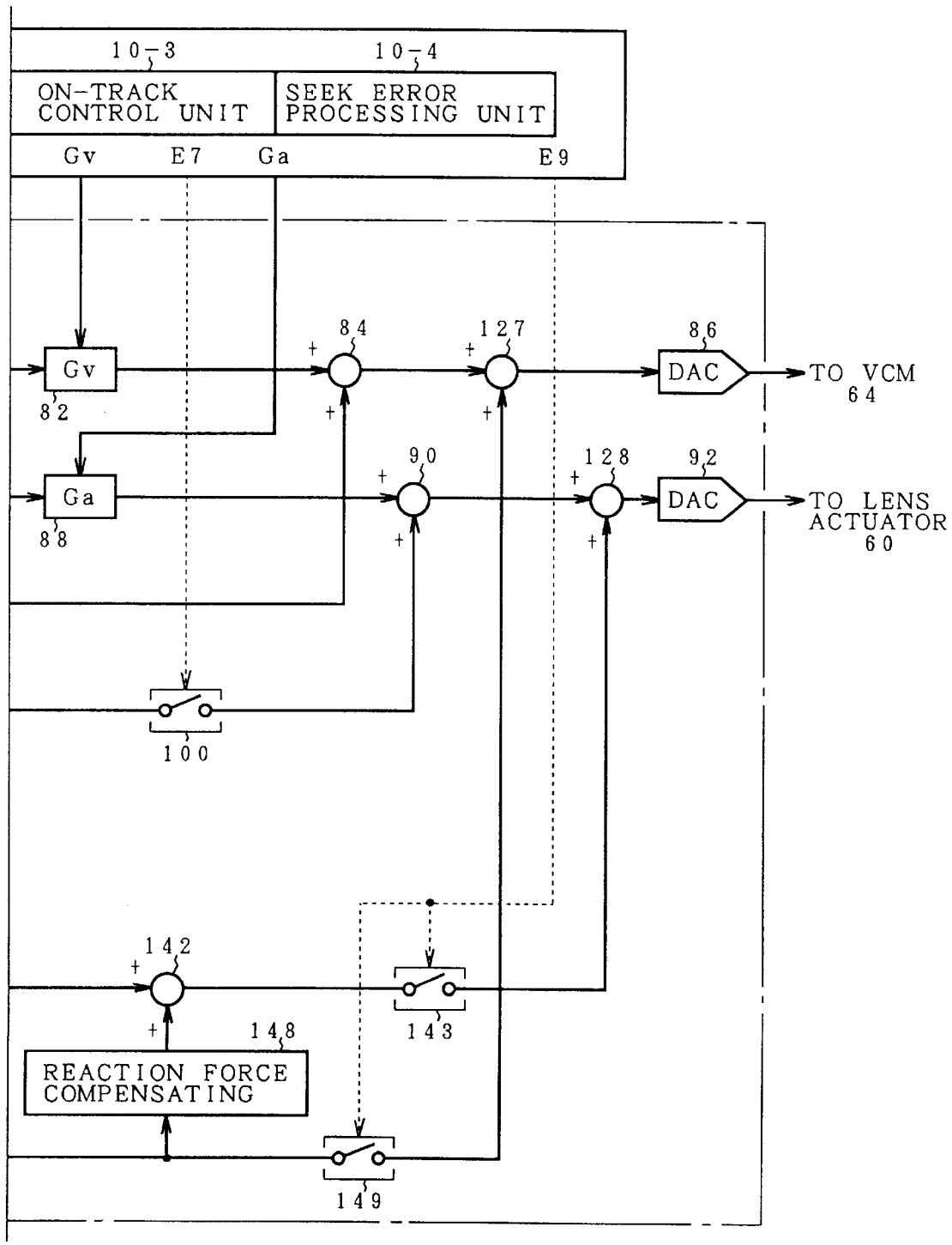

FIGS. 26A and 26B relate to the third embodiment of the invention. The third embodiment is characterized in that the lens lock control unit in the high speed seeking mode and that in the low speed seeking mode are commonly constructed in a manner similar to the second embodiment and, further, low pass filters of frequency characteristics corresponding to the low speed seek and the high speed seek are combined, thereby enabling the lens position signals to be detected from the tracking error signal. Subsequent to the low pass filter 94 for high speed seek in which the tracking error signal E2 is converted into the digital signal, a low pass filter 126 for low speed seek is serially connected to the low speed/high speed lens lock control unit 15-4. The low pass filter 126 for low speed seek has the cut-off frequency fc1 on the low frequency side as shown in the filter characteristics 124 in FIG. 20. An output of the LPF 126 for low speed seek is converted into digital data by an A/D converter 96-1 and is connected to the addition point 84 on the VCM 64 side through the phase compensating unit 110 and servo switch 112. On the other hand, an output of the LPF 94 for high speed seek is branched and is connected to the addition point 90 on the lens actuator 60 side through an A/D converter 96-2, phase compensating unit 98, and servo switch 100. The servo switches 112 and 100 are on/off controlled by the control signals E6 and E7 from the MPU 14. That is, in the low speed seek control, the servo switch 100 is turned off and the servo switch 112 is turned on. Therefore, the output from the LPF 94 for high speed seek to the adder 90 is disconnected. The lens position signal extracted by the LPF 126 for low speed seek is supplied to the addition point 84. The lens lock by the driving of the VCM 64 is performed during the speed control of the lens actuator 60. In this case, although the tracking error signal E1 passes through the LPF 94 for high speed seek, since the cut-off frequency fc2 is located on sufficiently the high frequency side as shown in FIG. 25, the tracking error signal E1 of 10 kHz or less during the low speed seek is inputted to the LPF 126 for low speed seek without being deteriorated by the LPF 94. Since the high frequency component exceeding the cut-off frequency fc2 is cut by the LPF 94, the S/N ratio of the tracking error signal which is inputted to the LPF 126 for low speed seek can be sufficiently improved. On the other hand, in the high speed seeking mode, the servo switch 100 is turned on and the servo switch 112 is turned off. Therefore, the output of the LPF 126 for low speed seek is disconnected and the output of the LPF 94 for high speed seek is supplied to the addition point 90 through the servo switch 100. In this instance, the tracking error signal has a high frequency of tens of kHz due to the high speed seek and the stable lens position signal can be obtained by the removal of the high frequency component by the LPF 94. The lens lock by the driving of the lens actuator 60 can be stably and certainly performed during the speed control by the driving of the VCM 64.

The on-track control unit 10-3 and seek error processing unit 10-4 provided in the MPU 14 in FIGS. 26A and 26B and the tracking servo unit 130 and double servo unit 132 provided in the DSP 15 are fundamentally the same as those in the embodiment of FIGS. 9A and 9B. In case of turning on the low speed lens lock control and controlling the lens optical axial deviation amount to zero when the seek error is detected, the seek error processing unit 10-4 turns on the servo switch 112 and drives the VCM 64 by the output of the LPF 126 for low speed seek, thereby performing the lens lock. In case of turning on the high speed lens lock control and controlling the lens optical axial deviation amount to zero when the seek error is detected, the seek error processing unit 10-4 turns on the servo switch 100 and drives the lens actuator 60 by the output of the LPF 94 for high speed seek, thereby performing the lens lock.

According to the invention as mentioned above, when the track pull-in fails and the seek error occurs when the light beam arrives at the target track, the low speed lens lock control unit or high speed lens lock control unit is turned on, thereby controlling the optical axial deviation amount of the objective lens to zero by the lens position signal falsely derived on the basis of the offset of the tracking error signal. Therefore, the run-away of the tracking actuator in the seek error state is suppressed, the track pull-in is again enabled, and the retry seek to recover the seek error can be promptly performed, so that an accessing performance of the optical disk drive can be improved.

In the above embodiments, although all of the speed control and the continuous control in the high speed seeking mode and low speed seeking mode are realized by the digital operating function of the DSP 15, the invention is not limited to it. A part or all of the above controls can be also realized by an analog circuit or a dedicated LSI circuit.

What is claimed is:

1. An optical storage apparatus comprising:
   a lens actuator for moving an objective lens to irradiate a light beam onto a medium in a direction traversing tracks on said medium;
   a carriage actuator for moving a carriage on which said lens actuator is mounted in a direction traversing the tracks on said medium;
   a tracking error signal forming unit for forming a tracking error signal according to a position of said light beam in the direction traversing the tracks on the basis of a photosensitive output of a return light of the medium;
   a low speed seek control unit for moving the light beam to a target position at a low speed by a driving of said lens actuator when the number of tracks to a target track is less than a predetermined value;
   a high speed seek control unit for moving the light beam at a high speed by a driving of said carriage actuator when the number of tracks to the target track is equal to or larger than said predetermined value and for switching a control mode to a low speed movement of the light beam by said low speed seek control unit when the number of tracks to the target track reaches said predetermined value during said high speed movement;
   a lens lock control unit for detecting an optical axial deviation amount of said objective lens from an offset of the tracking error signal which is obtained upon seeking and for controlling so as to set the optical axial deviation amount of said objective lens to zero;
   an on-track control unit for pulling in the light beam to the target track, thereby setting the light beam into an on-track state when the light beam reaches the target track by said low speed seek control unit; and
   a seek error processing unit for turning on said lens lock control unit and for controlling so as to set the optical axial deviation amount of said objective lens to zero when the pull-in of the target track by said on-track control unit fails and a seek error is detected and, thereafter, for allowing a retry seek to be performed.

2. An apparatus according to claim 1, wherein said seek error processing unit turns on said lens lock control unit for a predetermined specified time.

3. An apparatus according to claim 1, wherein said lens lock control unit comprises:
   a low speed lens lock control unit for detecting the optical axial deviation amount of said objective lens from the offset of the tracking error signal which is obtained during said low speed seek and for driving said carriage actuator so as to set said optical axial deviation amount to zero; and
   a high speed lens lock control unit for detecting the optical axial deviation amount of said objective lens from the offset of the tracking error signal which is obtained during said high speed seek and for driving said lens actuator so as to set said optical axial deviation amount to zero.

4. An apparatus according to claim 3, wherein when the seek error is detected due to the failure of the pull-in to the target track, said seek error processing unit turns on said low speed lens lock control unit and controls so as to set the optical axial deviation amount of said objective lens to zero by the driving of said carriage actuator.

5. An apparatus according to claim 3, wherein when the seek error is detected due to the failure of the pull-in to the target track, said seek error processing unit turns on said high speed lens lock control unit and controls so as to set the optical axial deviation amount of said objective lens to zero by the driving of said lens actuator.

6. An apparatus according to claim 3, wherein said low speed lens lock control unit comprises:
   a peak value detecting unit for detecting a positive peak value and a negative peak value of each cycle of the tracking error signal; and
   an offset operating unit for calculating a value of ½ of a difference between said positive and negative peak values as an offset amount and for detecting a pseudo lens position detection signal.

7. An apparatus according to claim 3, wherein said high speed lens lock control unit has a low pass filter for eliminating a high frequency component by a cut-off frequency corresponding to a frequency of the tracking error signal in the high speed seeking mode and for detecting an offset amount corresponding to a change in envelope of said tracking error signal as a lens position signal.

8. An apparatus according to claim 3, wherein said low speed and high speed lens lock control units comprise:
   a low pass filter for eliminating the high frequency component of the tracking error signal and for detecting an offset amount which traces a change in envelope as a lens position signal; and
   a filter characteristics switching unit for switching a cut-off frequency of said low pass filter to a low frequency side in the low speed seeking mode and to a high frequency side in the high speed seeking mode.

9. An apparatus according to claim 3, wherein said low speed and high speed lens lock control units comprise:
   a low pass filter for high speed for eliminating a high frequency component by a cut-off frequency on a high frequency side corresponding to a frequency of the tracking error signal in the high speed seeking mode and for outputting a resultant signal as a lens position signal; and
   a low pass filter for low speed, connected serially to said low pass filter for high speed, for eliminating a high frequency component by a cut-off frequency on a low frequency side corresponding to a frequency of the tracking error signal in the low speed seeking mode and for outputting a resultant signal as a lens position signal.

10. An apparatus according to claim 3, wherein said low speed seek control unit controls a speed of said lens actuator so as to trace a target velocity set in accordance with the number of tracks to the target track and gives an acceleration or deceleration for inertia compensation corresponding to an acceleration or deceleration of said lens actuator to said carriage actuator in each of an acceleration period and a deceleration period of said speed control, respectively.

11. An apparatus according to claim 10, wherein said low speed seek control unit supplies an inertia compensation current I$v$ obtained by multiplying an acceleration or deceleration current I$a$ of said lens actuator with an inertia compensation coefficient α1 to said carriage actuator.

12. An apparatus according to claim 11, wherein said inertia compensation coefficient α1 is defined as $$α1=(Kv/Ka)·\{Ma/(Ma+Mv)\}$$

where, Ka: acceleration gain of the lens actuator
Kv: acceleration gain of the carriage actuator
Ma: mass of the lens actuator
Mv: mass of the carriage actuator.

13. An apparatus according to claim 3, wherein said high speed seek control unit controls a speed of said carriage actuator so as to trace a target velocity set in accordance with the number of tracks to the target track and gives an acceleration or deceleration for inertia compensation corresponding to an acceleration or deceleration of said carriage actuator to said lens actuator in each of an acceleration period and a deceleration period of said speed control.

14. An apparatus according to claim 13, wherein said low speed seek control unit supplies an inertia compensation current I$a$ obtained by multiplying an acceleration or deceleration current I$v$ of said carriage actuator with an inertia compensation coefficient α2 to said lens actuator.

15. An apparatus according to claim 14, wherein said inertia compensation coefficient α2 is defined as $$α2=(Ka/Kv)·\{Mv/(Ma+Mv)\}$$

where, Ka: acceleration gain of the lens actuator
Kv: acceleration gain of the carriage actuator
Ma: mass of the lens actuator
Mv: mass of the carriage actuator.

16. An apparatus according to claim 3, wherein said low speed seek control unit and said high speed seek control unit smoothly change an acceleration current and a deceleration current of a seek control, thereby smoothly accelerating and decelerating said lens actuator and said carriage actuator.

17. An apparatus according to claim 1, wherein said on-track control unit has a tracking servo unit for driving said lens actuator so as to set the tracking error signal to zero, and said on-track control unit predicts a motion of said lens actuator from a drive current of said lens actuator by said tracking servo unit, obtains the optical axial deviation amount of said objective lens, and drives said carriage actuator so as to set said optical axial deviation amount to zero, thereby allowing a carriage to trace a motion of the objective lens.

18. An optical storage apparatus comprising:

a lens actuator for moving an objective lens to irradiate a light beam onto a medium in a direction traversing tracks on said medium;

a carriage actuator for moving a carriage on which said lens actuator is mounted in a direction traversing the tracks on said medium;

a tracking error signal forming unit for forming a tracking error signal according to a position of said light beam in the direction traversing the tracks on the basis of a photosensitive output of a return light of the medium;

low speed seek control unit for moving the light beam to a target position at a low speed by a driving of said lens actuator when the number of tracks to a target track is less than a predetermined value;

a high speed seek control unit for moving the light beam at a high speed by a driving of said carriage actuator when the number of tracks to the target track is equal to or larger than said predetermined value and for switching a control mode to a low speed movement of the light beam by said low speed seek control unit when the number of tracks to the target track reaches said predetermined value during said high speed movement; and a lens lock control unit for detecting an optical axial deviation amount of said objective lens from an offset of the tracking error signal which is obtained upon seeking and for controlling so as to set the optical axial deviation amount of said objective lens to zero, wherein said lens lock control unit comprises a low speed lens lock control unit for detecting the optical axial deviation amount of said objective lens from the offset of the tracking error signal which is obtained during said low speed seek and for driving said carriage actuator so as to set said optical axial deviation amount to zero, and a high speed lens lock control unit for detecting the optical axial deviation amount of said objective lens from the offset of the tracking error signal which is obtained during said high speed seek and for driving said lens actuator so as to set said optical axial deviation amount to zero.

* * * * *